(12) United States Patent
Oh et al.

(10) Patent No.: US 7,878,470 B2
(45) Date of Patent: Feb. 1, 2011

(54) MOTORIZED MOUNT SYSTEM FOR REPOSITIONING A MONITOR

(75) Inventors: Sung Il Oh, West Covina, CA (US); Byung Ju Yi, Bucheon (KR); Gyu Chang Kim, Suwon Si (KR)

(73) Assignee: CLO Systems, LLC

( * ) Notice: Subject to any disclaimer, the term of this patent is extended or adjusted under 35 U.S.C. 154(b) by 1033 days.

(21) Appl. No.: 11/602,859

(22) Filed: Nov. 21, 2006

(65) Prior Publication Data

US 2007/0125917 A1 Jun. 7, 2007

Related U.S. Application Data

(60) Provisional application No. 60/738,888, filed on Nov. 21, 2005, provisional application No. 60/758,621, filed on Jan. 12, 2006.

(51) Int. Cl.
*E04G 3/00* (2006.01)

(52) U.S. Cl. .................. 248/278.1; 248/919

(58) Field of Classification Search .......... 248/278.1, 248/274.1, 276.1, 279.1, 280.11, 176.3, 694, 248/282.1, 917, 919; 361/679.02, 679.04; 340/500, 384.1
See application file for complete search history.

(56) References Cited

U.S. PATENT DOCUMENTS

| | | | |
|---|---|---|---|
| 1,498,813 A | 6/1924 | Sankela et al. |
| 4,025,053 A | 5/1977 | Stickle, Jr. |
| 4,203,636 A | 5/1980 | Wells |
| 4,712,653 A | 12/1987 | Franklin et al. |
| 4,720,805 A | 1/1988 | Vye |
| 4,959,645 A | 9/1990 | Balz |
| 5,124,805 A | 6/1992 | Chung et al. |
| 5,261,645 A | 11/1993 | Huffman |
| 5,321,579 A | 6/1994 | Brown et al. |
| 5,366,203 A | 11/1994 | Huffman |
| 5,474,376 A | 12/1995 | Saunders |
| 5,525,019 A | 6/1996 | Moore et al. |
| 5,583,735 A | 12/1996 | Pease et al. |
| 5,592,724 A | 1/1997 | Linville et al. |
| 5,618,995 A | 4/1997 | Otto et al. |
| 5,634,622 A | 6/1997 | Pye |
| 5,668,570 A | 9/1997 | Ditzik |
| 5,694,864 A | 12/1997 | Langewellpott |
| 5,715,138 A | 2/1998 | Choi |
| 6,095,476 A | 8/2000 | Mathis |
| 6,109,395 A | 8/2000 | Storm |
| 6,149,253 A | 11/2000 | Talasani |

(Continued)

FOREIGN PATENT DOCUMENTS

CH 653 464 A5 12/1985

(Continued)

OTHER PUBLICATIONS

Dave Coleman-Sport Compact Car Technobabble: Multilink and the Beam, published Nov. 1998.

(Continued)

*Primary Examiner*—Ramon O Ramirez

(57) ABSTRACT

A motorized mount attaches a monitor to a wall and is able is able to reposition the angle of a monitor through motorized action. The motorized mount can extend the and then swivel and/or tilt the monitor.

36 Claims, 19 Drawing Sheets

U.S. PATENT DOCUMENTS

| | | | |
|---|---|---|---|
| 6,152,410 A | 11/2000 | Mark | |
| 6,170,408 B1 | 1/2001 | Gombrich | |
| 6,186,279 B1 | 2/2001 | Blocker | |
| 6,257,372 B1 | 7/2001 | Schirmer | |
| 6,288,891 B1 | 9/2001 | Hasegawa et al. | |
| 6,354,550 B2 | 3/2002 | Jeong | |
| 6,384,875 B2 | 5/2002 | Bertagna | |
| 6,419,196 B1 | 7/2002 | Sweere et al. | |
| 6,484,993 B2 | 11/2002 | Huffman | |
| 6,526,611 B2 | 3/2003 | Flynn et al. | |
| 6,532,147 B1 | 3/2003 | Christ, Jr. | |
| 6,554,242 B2 | 4/2003 | Kim | |
| 6,585,214 B1 | 7/2003 | Dittmer | |
| 6,586,854 B1 | 7/2003 | Nozawa et al. | |
| 6,604,722 B1 | 8/2003 | Tan | |
| 6,619,960 B1 | 9/2003 | Horn | |
| 6,633,276 B1 | 10/2003 | Jaynes | |
| 6,633,286 B1 * | 10/2003 | Do et al. | 345/205 |
| 6,637,818 B2 | 10/2003 | Williams | |
| 6,655,645 B1 | 12/2003 | Lu et al. | |
| 6,679,479 B1 | 1/2004 | Watkins | |
| 6,905,101 B1 * | 6/2005 | Dittmer | 248/274.1 |
| 7,398,950 B2 * | 7/2008 | Hung | 248/276.1 |
| 2003/0080949 A1 | 5/2003 | Ditzik | |
| 2004/0075970 A1 | 4/2004 | Einhorn et al. | |
| 2005/0110911 A1 | 5/2005 | Childrey et al. | |
| 2007/0181762 A1 * | 8/2007 | Dittmer | 248/274.1 |
| 2008/0156953 A1 * | 7/2008 | Oh et al. | 248/284.1 |

FOREIGN PATENT DOCUMENTS

| | | |
|---|---|---|
| DE | 102 24 764 A1 | 12/2002 |
| GB | 2370171 A | 6/2002 |
| JP | 08 312885 A | 11/1996 |

OTHER PUBLICATIONS

Whee-Kuk Kim and Byung Ju Yi—Analysis of Parallel Mechanisms with Forward Position Closed-Form Solution with Application to Hybrid Manipulator, published 1999.

Erard Motion- www.erard.com, no publication date.

Inca Corporation—"Plasma TV Motorized Wall Mounted Automatic Swivel with Tilt," no pub. date.

Future Automation—www.futureautomation.co.uk, Motorized Mount "MOT42/50", published Apr. 27, 2005.

* cited by examiner

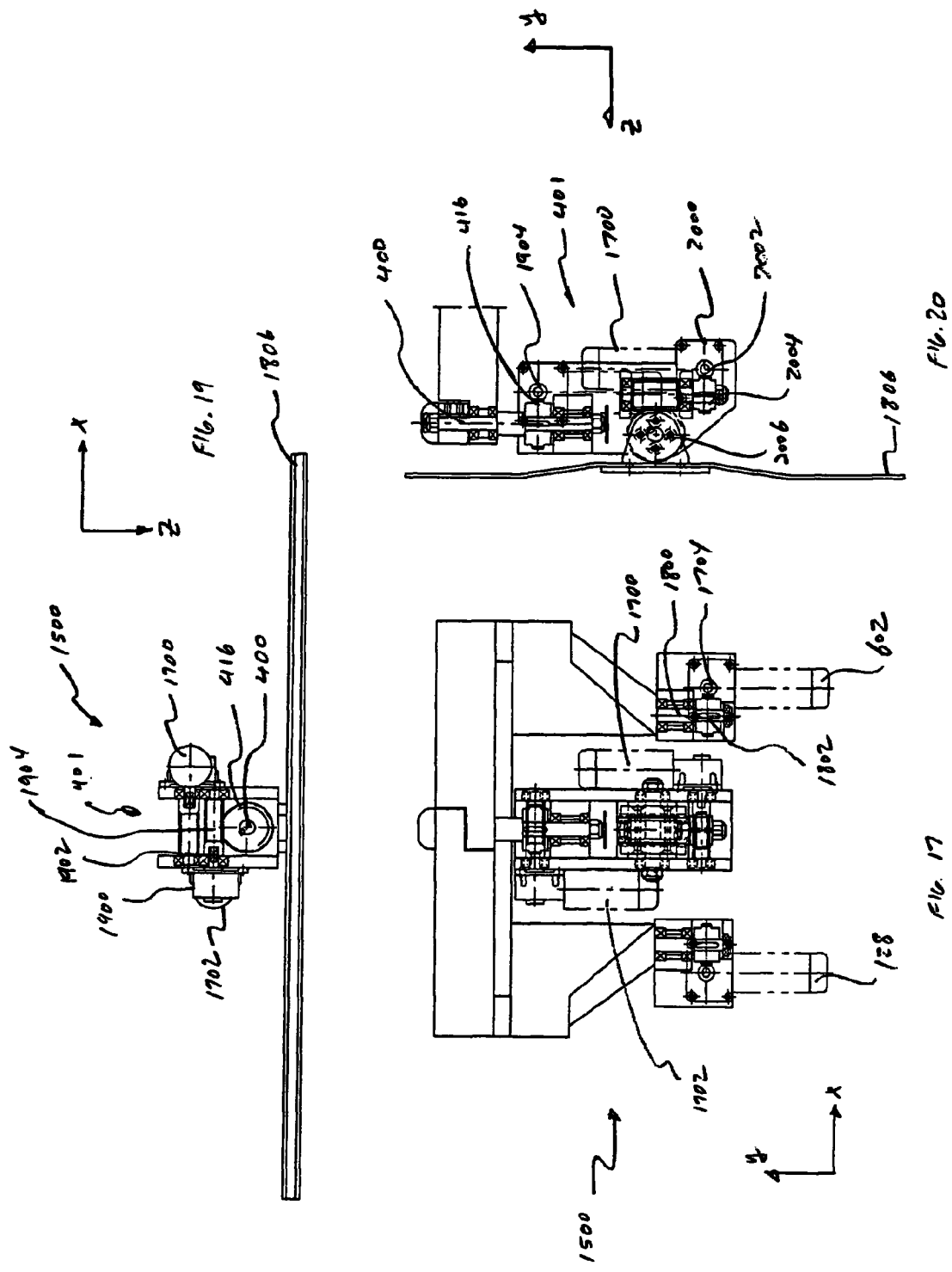

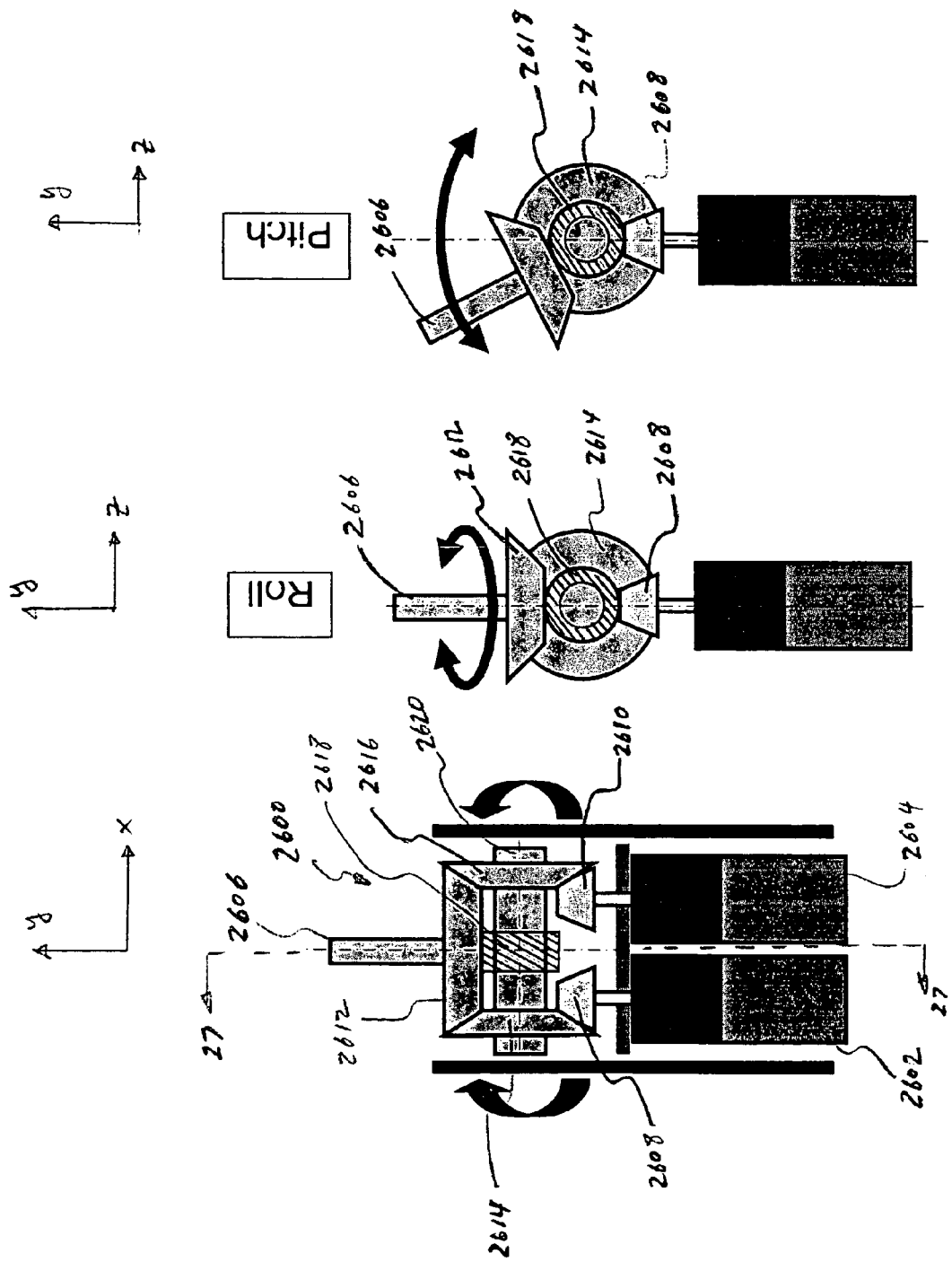

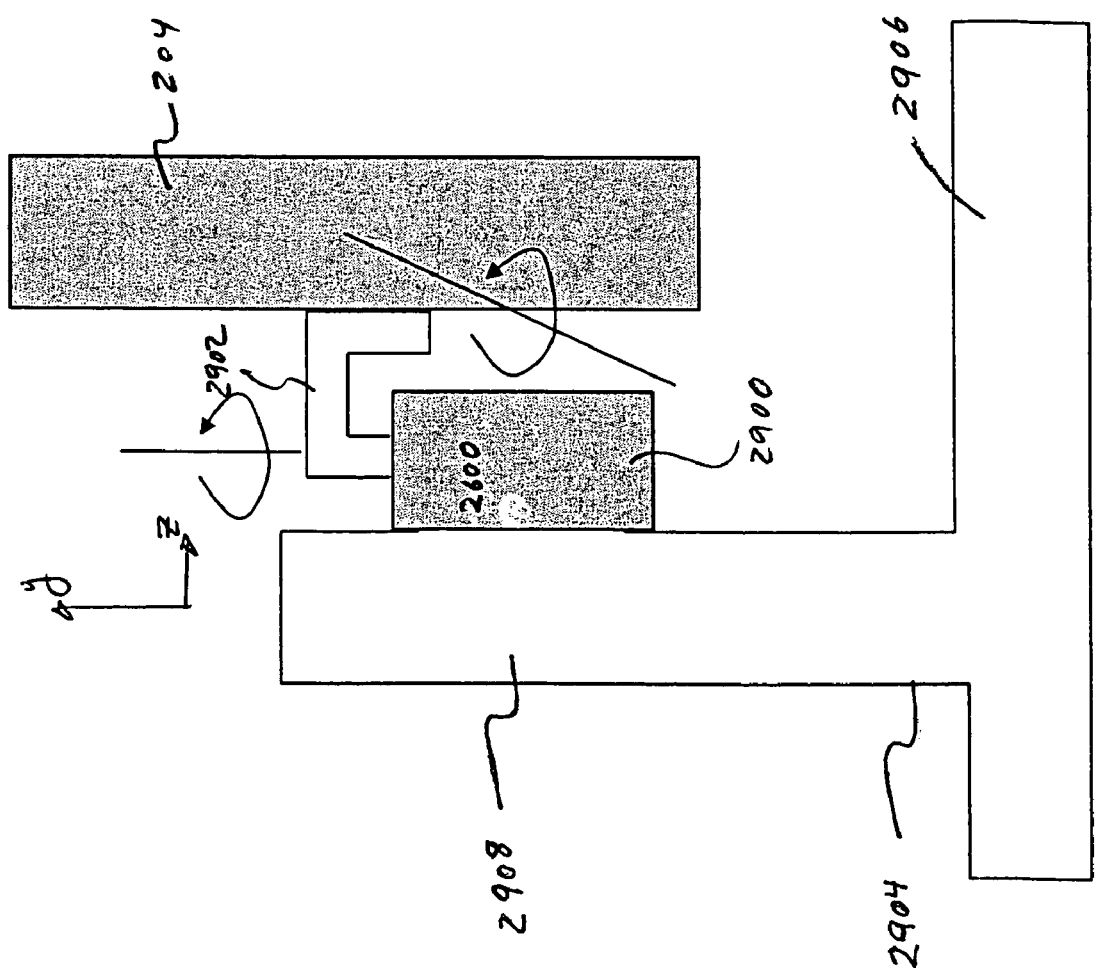

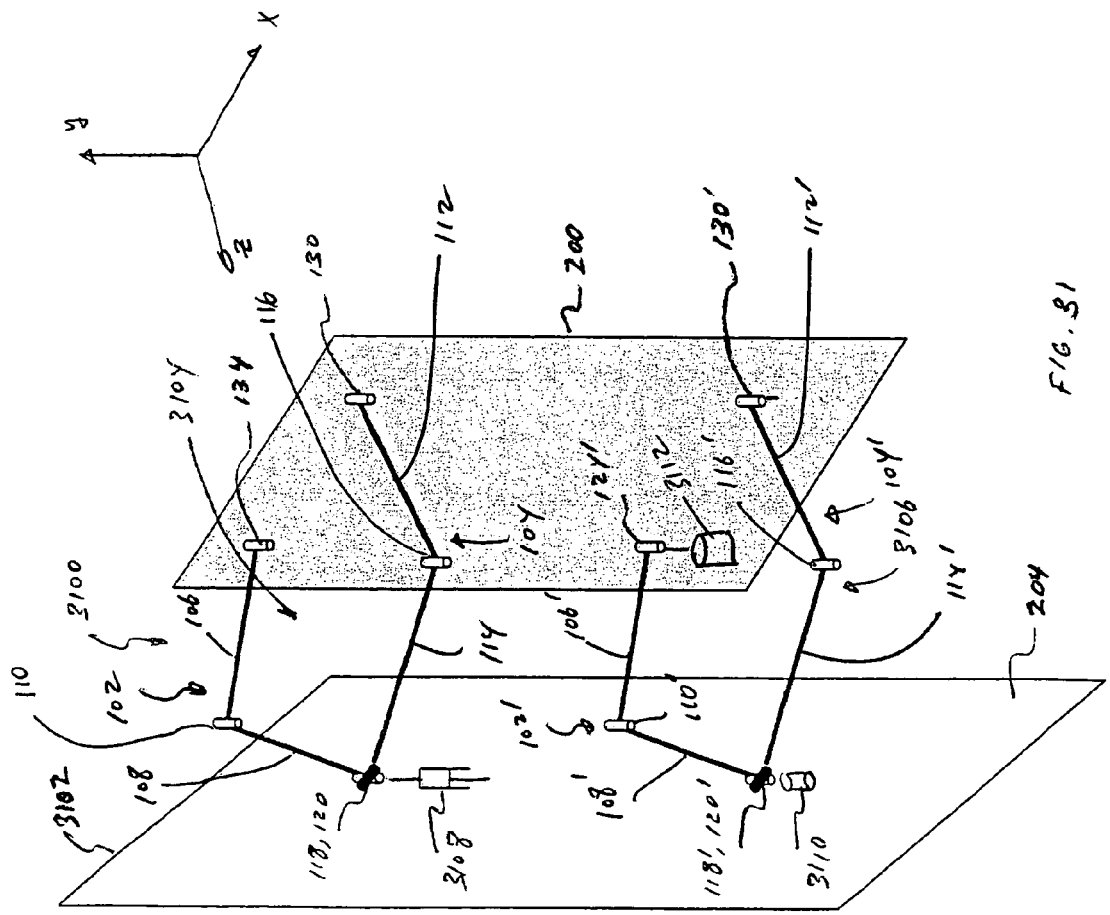

MOTORIZED MOUNT SYSTEM FOR REPOSITIONING A MONITOR

RELATED APPLICATIONS

This application claims priority to two provisional applications: (1) provisional Ser. No. 60/738,888, filed Nov. 21, 2005; and (2) provisional Ser. No. 60/758,621, filed Jan. 12, 2006, which are both hereby incorporated by references.

FIELD OF THE INVENTION

This invention is directed to a mounting system capable of adjusting the position of an apparatus relative to a reference plane. In particular, the mounting system is capable of mounting a monitor to a surface, such as a wall, and adjusting the viewing angle of the monitor though motorized action based on an input signal from a remote control.

BACKGROUND OF THE INVENTION

Flat panel monitors such as computer monitors, TFT, LCD, plasma, slim televisions, and the like (collectively referred to as "monitor(s)") are becoming popular because they can be mounted onto a wall to save floor space and for their aesthetically pleasing appearance. In particular, monitors are generally mounted to a wall with a mechanical support arm or a bracket then fixed in a desired orientation to maximize the viewing angle of the monitor. To later adjust the viewing angle of the monitor, however, a viewer generally tilts the monitor manually to a new viewing angle so that the viewer may more comfortably view the monitor from a different location or to deflect glare on the monitor away from the viewer. For instance, a monitor may be fixed to a wall in a family room to allow the family members or one viewer to view the monitor at the desired viewing angle. As the viewer moves from one area to another area, such as from the family room to the kitchen, the viewer may not be able to view the monitor. In addition, in situations where the monitor is mounted in a remote location or high above the floor, it may be inconvenient for the viewer to adjust the viewing angle of the monitor. Accordingly, there is a need for a mounting system that can mount a larger and heavier monitor to a wall and allow the viewing angle of the monitor to be more easily adjusted.

SUMMARY OF THE INVENTION

This invention is directed to a motorized mount system that attaches an apparatus, such as a monitor, to a vertical support surface, such as a wall, and repositions the monitor based on a control signal from a remote control. The motorized mount system includes a first pair of arms between a base plate and an adapter plate. The base plate is adapted to attach to a wall and the adapter plate is adapted to attach to a back side of the monitor. The first pair of arms includes two pivoting arms, which may be symmetrical with respect to each other. The proximal ends of the two pivoting arms are pivotably coupled to the base plate and the distal ends of the two pivoting arms are pivotably coupled to the adapter plate. At least one of the proximal end of the first pair of arms may be engaged with a motor to rotate the distal end about its axis, which in tern extends or retracts the distal ends of the first pair of arms. Another motor may be coupled to the distal end of the first pair of arms to swivel the monitor side to side. Yet another motor may be coupled to the distal end of the first pair of arms to tilt the monitor up and down.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 17 is a front view of the motorized mount system of FIG. 15.

FIG. 18 is a side view of the motorized mount system of FIG. 15.

FIG. 19 is a top view of the gear housing of the motorized mount system of FIG. 15.

FIG. 20 is a side view of the gear housing of the motorized mount system of FIG. 15.

FIG. 26 is an elevational view of a gear system along a XY plane.

FIG. 27 is a side view of the gear system of FIG. 26 illustrating the roll of the main shaft.

FIG. 28 is a side view of the gear system of FIG. 26 illustrating the pitch of the main shaft.

FIG. 29 is side view of a housing enclosing the gear system supporting a monitor mounted to a stand.

FIG. 31 is a perspective view of another motorized mount system.

DETAIL DESCRIPTION OF THE INVENTION

Figure 1:
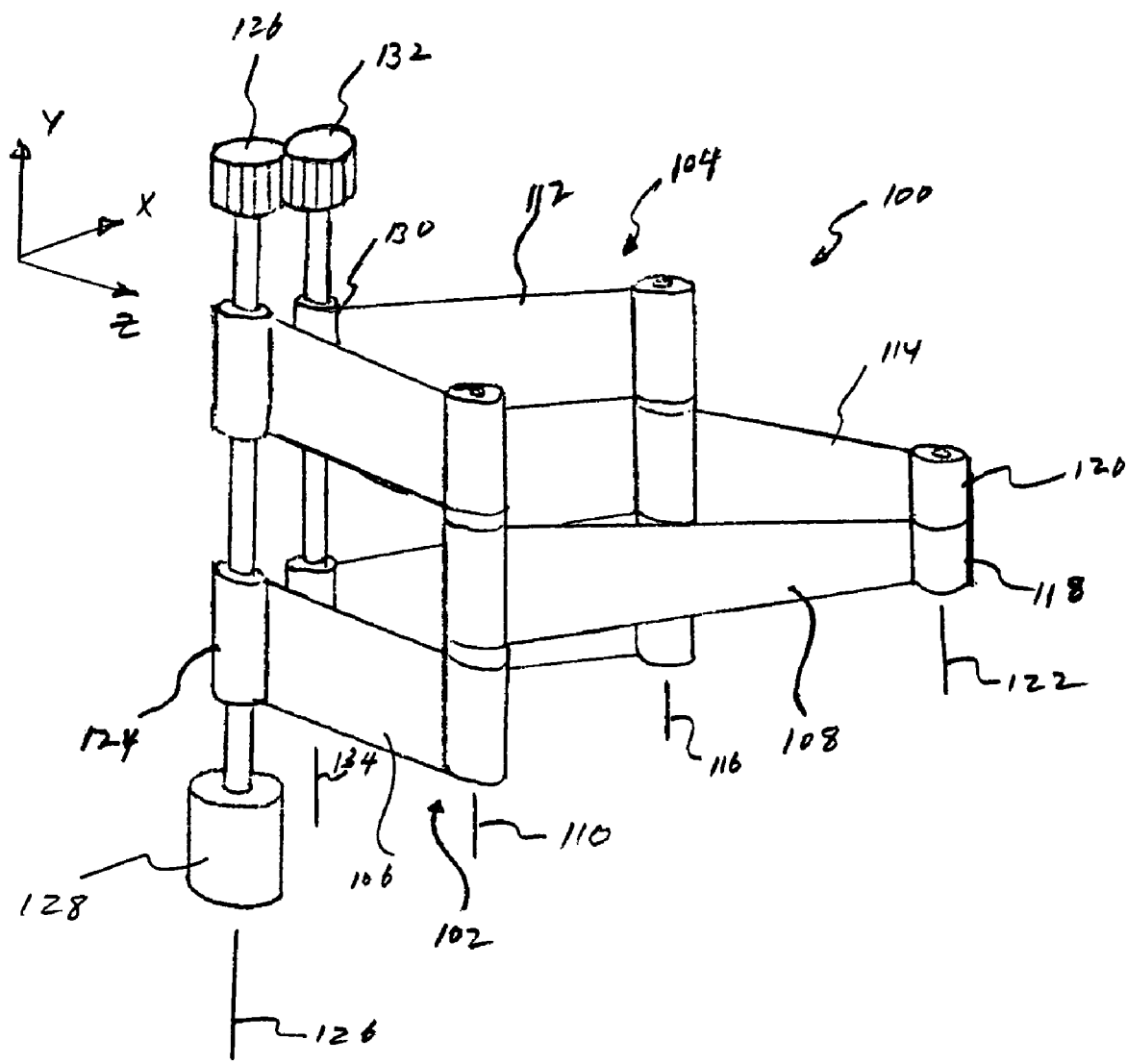
FIG. 1 shows a perspective view of motorized mount system.

FIG. 1 shows a perspective view of a motorized mount system 100 capable of extending a monitor from a reference plane, and tilting and swiveling the monitor in reference to X, Y, and Z axes. The motorized mount system 100 includes a first arm 102 and a second arm 104, which may be symmetrical with respect to each other. The first arm 102 includes a first rear-arm 106 and a first forearm 108, which are pivotably coupled to each other along a first pivot axis 110. Similarly, the second arm 104 includes a second rear-arm 112 and a second forearm 114, which are pivotably coupled to each other along a second pivot axis 116. The distal ends 118 and 120 of the first and second arms 102 and 104, respectively, may be pivotably coupled to each other along a third pivot axis 122. The proximal end 124 of the first rear-arm 106 may be provided with a first gear 126 and adapted to pivot about a fourth pivot axis 126. The first gear 126 may be coupled to a first motor 128 that can rotate the first gear 126 about the fourth pivot axis 126. The proximal end 130 of the second rear-arm 114 may be provided with a second gear 132 and adapted to pivot about a fifth pivot axis 134. The first and second gears 126 and 132 may be engaged with each other such that the two gears 126 and 132 may rotate in opposite directions with respect to each other. The gear ratio of the two gears 126 and 132 may be substantially the same so that the two gears rotate in the opposite direction at a same rate.

Figure 2:
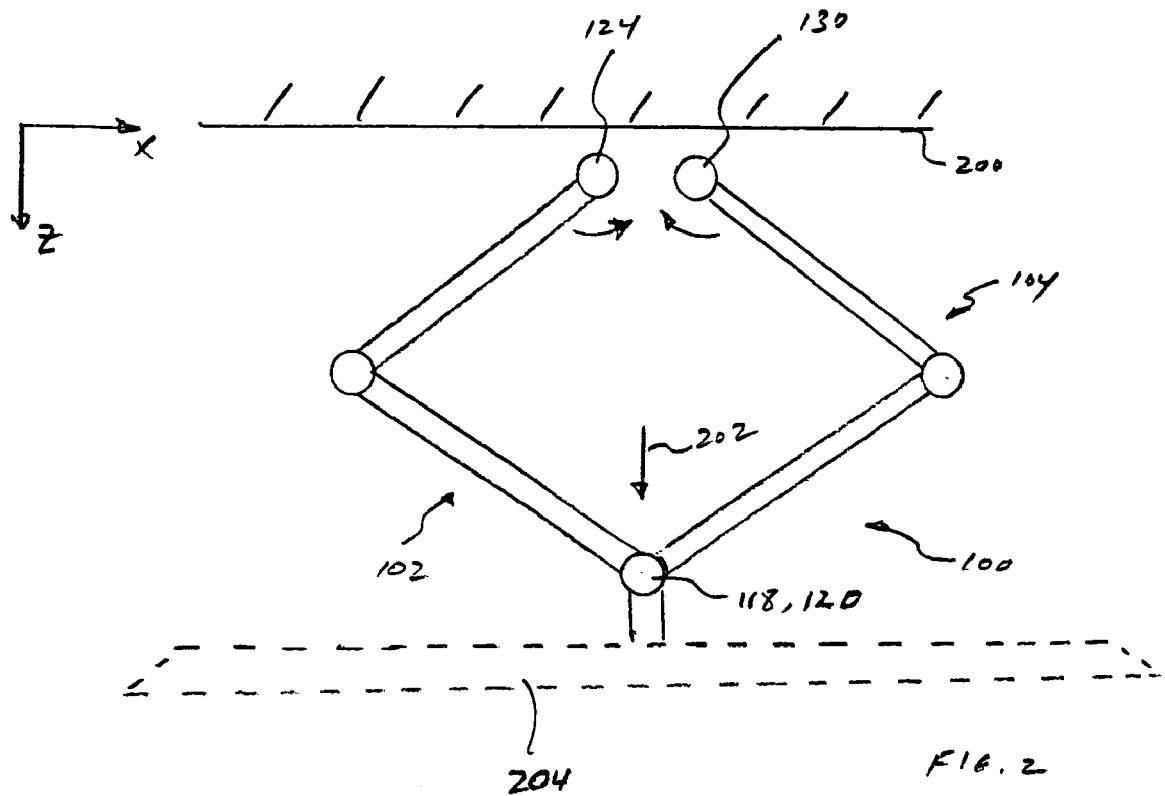
FIG. 2 shows a top view of the motorized mount system of FIG. 1 in an extended position.

FIG. 2 shows a top view of the motorized wall mounting system 100 illustrating that as the first motor 128 rotates the first gear 126 in a counter-clockwise direction, the proximal end 124 rotates in a counter-clockwise direction and conversely, the proximal end 130 rotates in a clockwise direction, thereby causing the distal ends 118 and 120 to extend from a reference plane 200. The two arms 102 and 104 may be symmetrical with respect to each other so that the distal ends 118 and 120 may extend from the wall 200 substantially along a perpendicular direction with respect to the reference plane 200, as indicated by the direction arrow 202. The distal ends 118 and 120 may be adapted to couple to a monitor 204 to extend the monitor 204 from the reference plane 200 such as a vertical wall.

Figure 3:
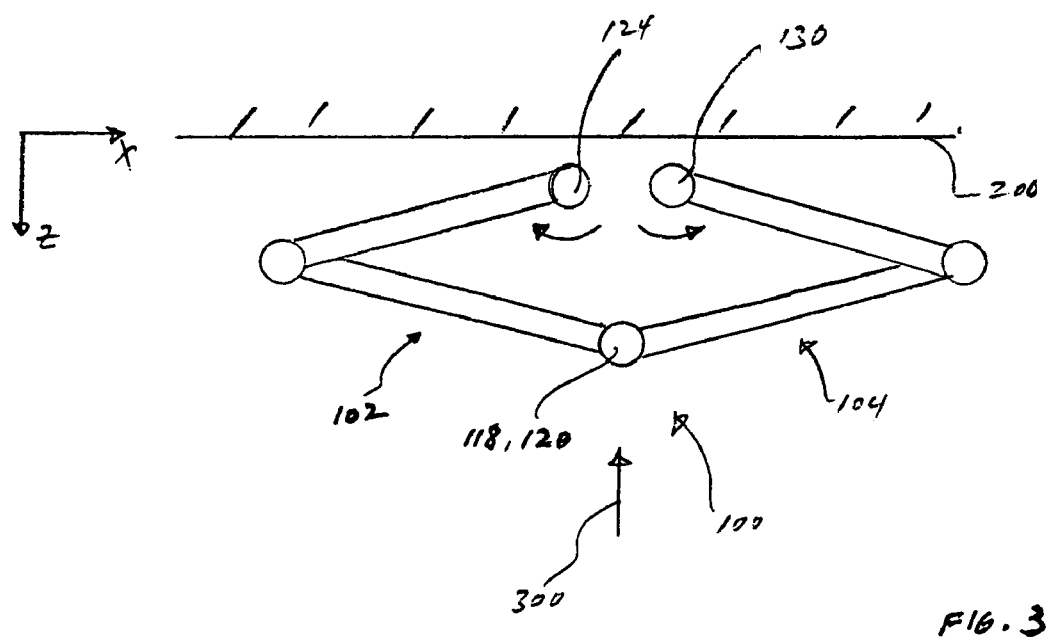
FIG. 3 shows a top view of the motorized mount system of FIG. 1 in a retracted position.

FIG. 3 shows a top view of the motorized wall mounting system 100 illustrating that as the first motor 128 rotates the first gear 126 in a clockwise direction, the proximal end 124 rotates in a clockwise direction and the proximal end 130 rotates in a counter-clockwise direction, thereby causing the distal ends 118 and 120 to retract toward the reference plane 200. The two arms 102 and 104 may be symmetrical with respect to each other so that the distal ends 118 and 120 may retract toward the wall 200 substantially along a perpendicular direction with respect to the reference plane 200, as indicated by the direction arrow 300.

Figure 4:
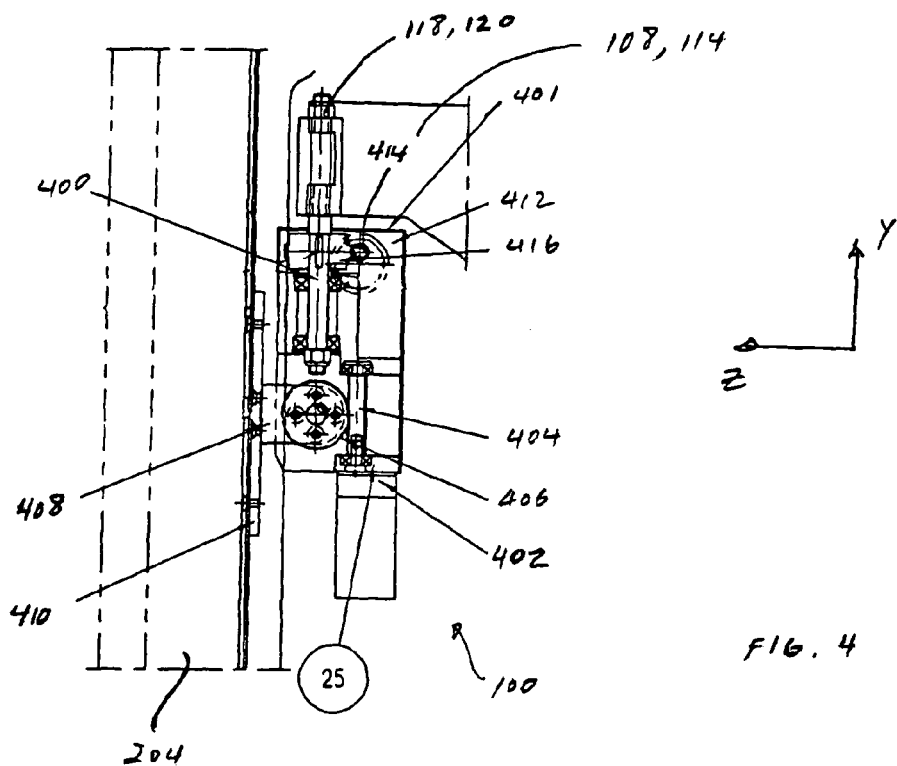
FIG. 4 shows a gear box coupled to the distal end of the motorized mount system of FIG. 1 capable of tilting and swiveling a monitor.

FIG. 4 shows a side view of the motorized wall mounting system 100 capable of tilting the monitor 204 along the YZ plane and swiveling the monitor along the XZ plane or between left and right. The motorized wall mounting system 100 may include a shaft 400 to couple the distal ends 118 and 120 of the arm 100 to a gear housing 401. The gear housing 401 may enclose the gear mechanisms, as discuss below, and capable of tilting and swiveling the monitor 204 relative to the distal ends 118 and 120. The gear housing 401 includes a second motor 402 coupled to a first worm screw 404. The first worm screw 404 extends from the second motor and it is engaged with a first worm wheel 406. The first worm wheel 406 may be coupled to a hinge 408 that is attached to an adapter plate 410. The adapter plate 410 may be adapted to couple to the back side of the monitor 204. As the second motor 402 rotates the worm screw 404, the first worm wheel 406 rotates either clockwise or counter-clockwise direction along the YZ plane depending on the rotational direction of the second motor 402. As the first worm wheel rotates, the back plate 410 tilts along the YZ plane, thereby tilting the monitor along the YZ plane.

The gear housing 401 also includes a third motor 412 with a second worm screw 414. The second worm screw 414 may be engaged with a second worm wheel 416 that is attached to the shaft 400 such that rotation of the second worm wheel 416 causes the gear housing 401 to rotate as well around the shaft 400. Accordingly, as the third motor 412 is activated, the monitor 204 may swivel around the shaft 400 in either direction.

Figure 5:
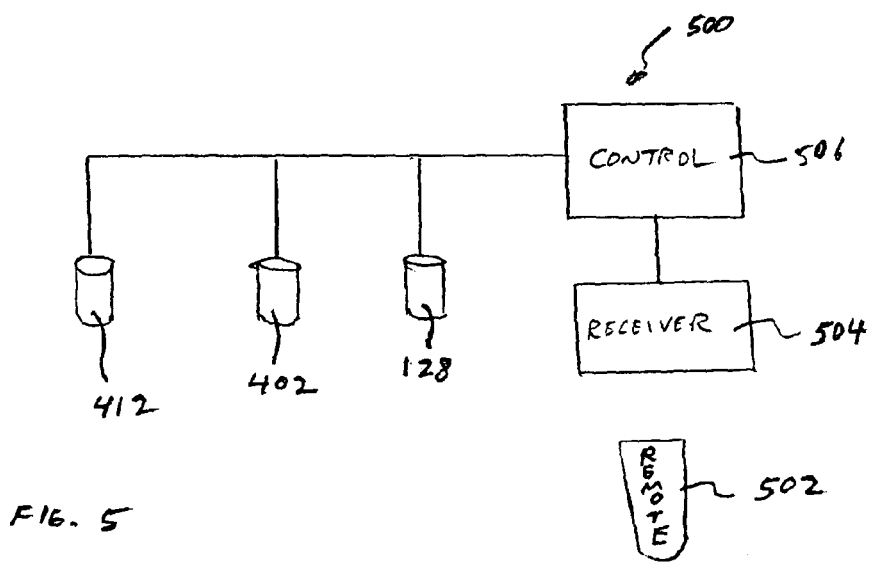
FIG. 5 shows block a diagram of the control system.

FIG. 5 shows a block diagram 500 illustrating a remote control 502 capable of controlling the viewing angle of the monitor 204 by sending a signal to a receiver 504. Once the receiver 504 receives the signal from the remote control 502, the control signal may be forwarded to a control 506. Based on the control signal, the control 506 may activate one or more motors to adjust the viewing angle of the monitor 204. For instance, the control 506 may extend the monitor 204 from the wall by activating the motor 128. Once the monitor 204 is extended, the control 506 may tilt and/or swivel the monitor 204 by activating the motor 402 and/or motor 412 accordingly.

Figure 6:
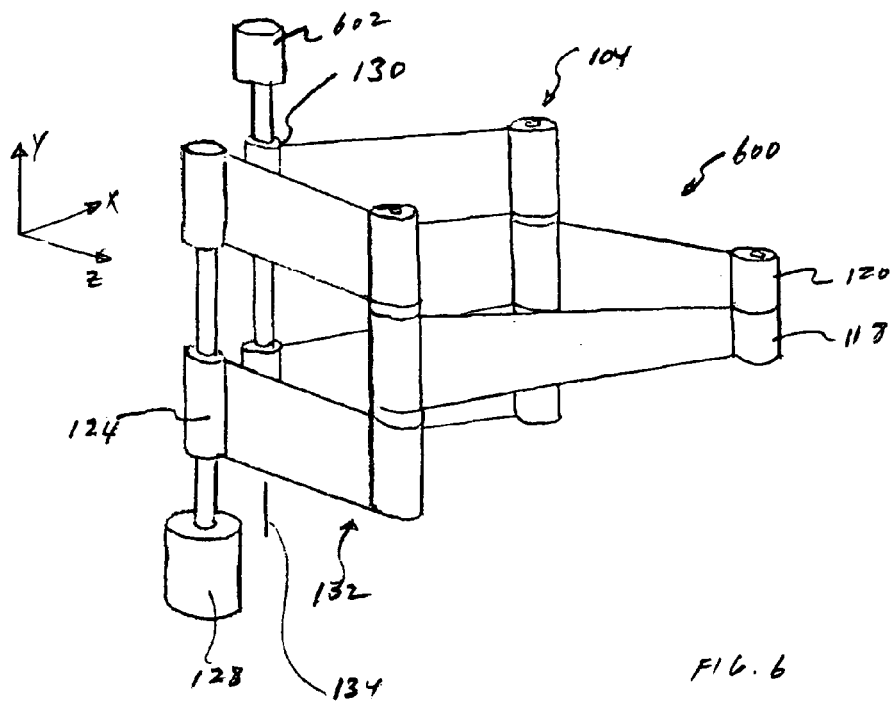
FIG. 6 shows a perspective view of a motorized mount system capable of moving a monitor laterally.
Figure 7:
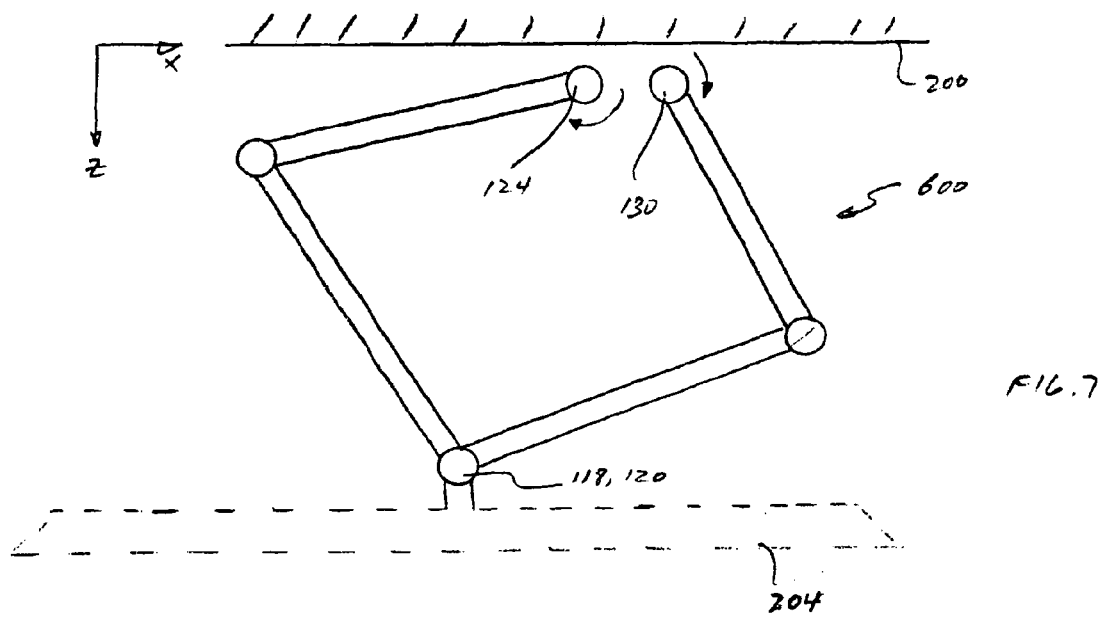
FIG. 7 shows a top view of the motorized mount system of FIG. 6.

FIG. 6 shows a perspective view of a motorized wall mount system 600 having a first motor 128 coupled to the proximal end 124, as discussed above, and also a fourth motor 602 coupled to the proximal end 130 to independently pivot the proximal end 130 about the pivot axis 134. The two motors 128 and 602 may be activated independently to extend the distal ends 118 and 120 perpendicular to the reference plan 200 or non-perpendicular along the XY plane. For instance, FIG. 7 shows that if the two motors 128 and 602 are activated to cause the proximal ends 124 and 130 to both rotate in clockwise direction, then the distal ends 118 and 120 may extend from the reference plane 200 but in the negative X direction or to the left, and vice versa.

Figure 8:
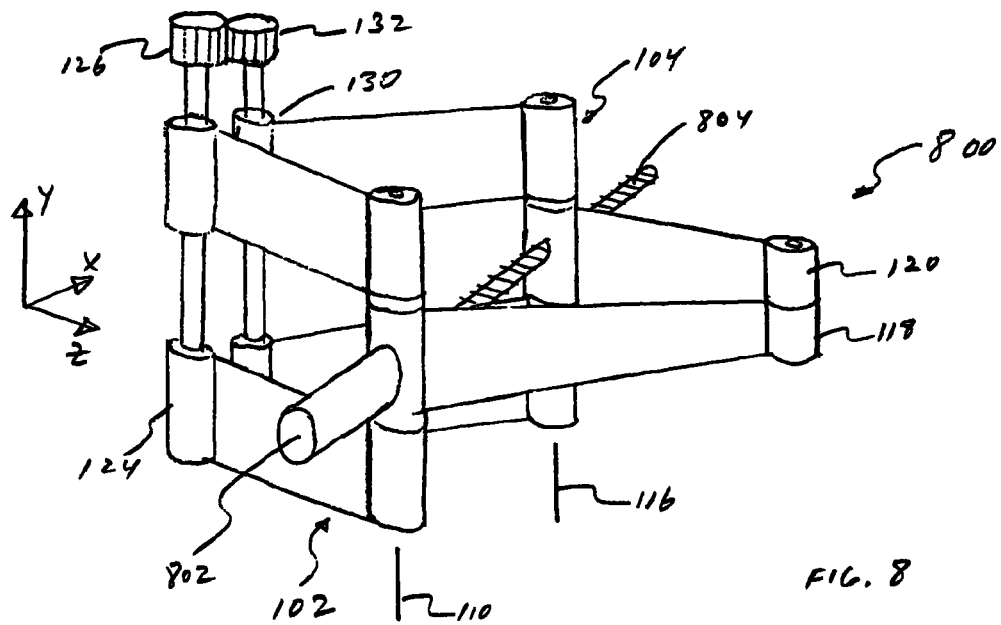
FIG. 8 shows a perspective view of another motorized mount system.
Figure 9:
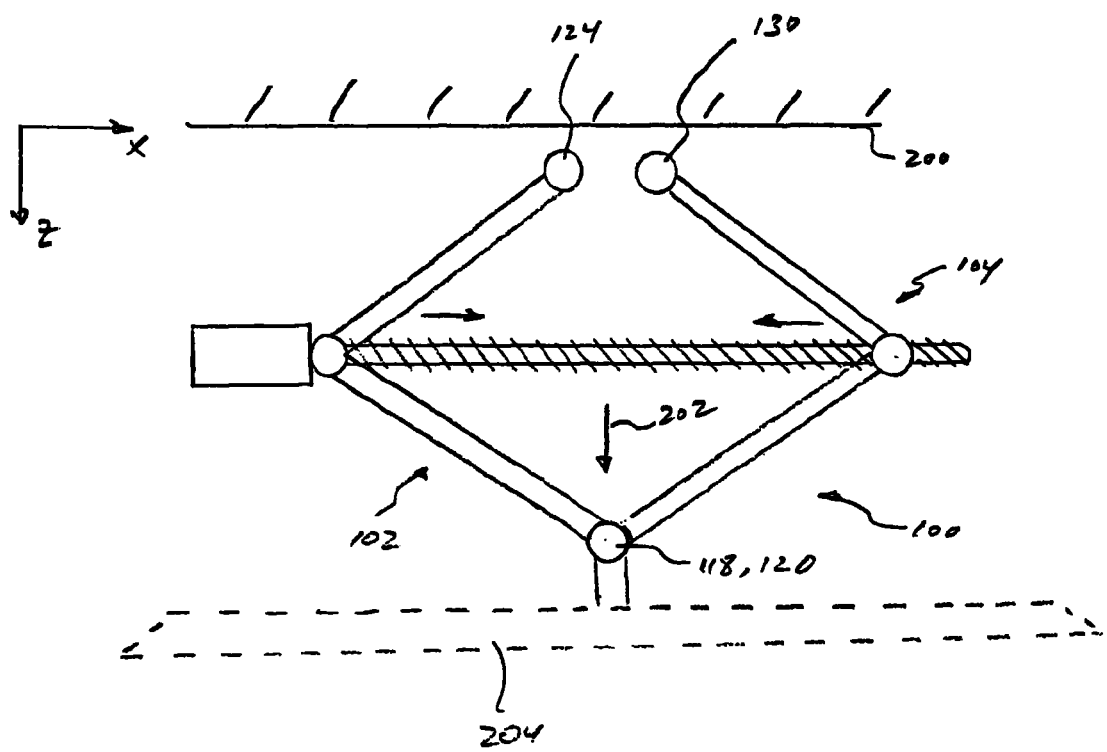
FIG. 9 shows a top view of the motorized mount system of FIG. 8.

FIG. 8 shows a perspective view of a motorized wall mount system 800 having a motor 802 with a screw 804 passing through the first arm 102 and the second arm 104 along the pivot axes 110 and 116. The proximal ends 124 and 130 may be engaged with each other through the gears 126 and 132. As the motor 802 rotates the screw 804, the two arms 102 and 104 may move closer or away from each other causing the distal ends 118 and 120 to extend and retract, respectively, relative to the reference plane 200. For instance, FIG. 9 shows that by moving the two arms 102 and 104 closer to each other, the distal ends 118 and 120 may extend from the wall 200.

Figure 10:
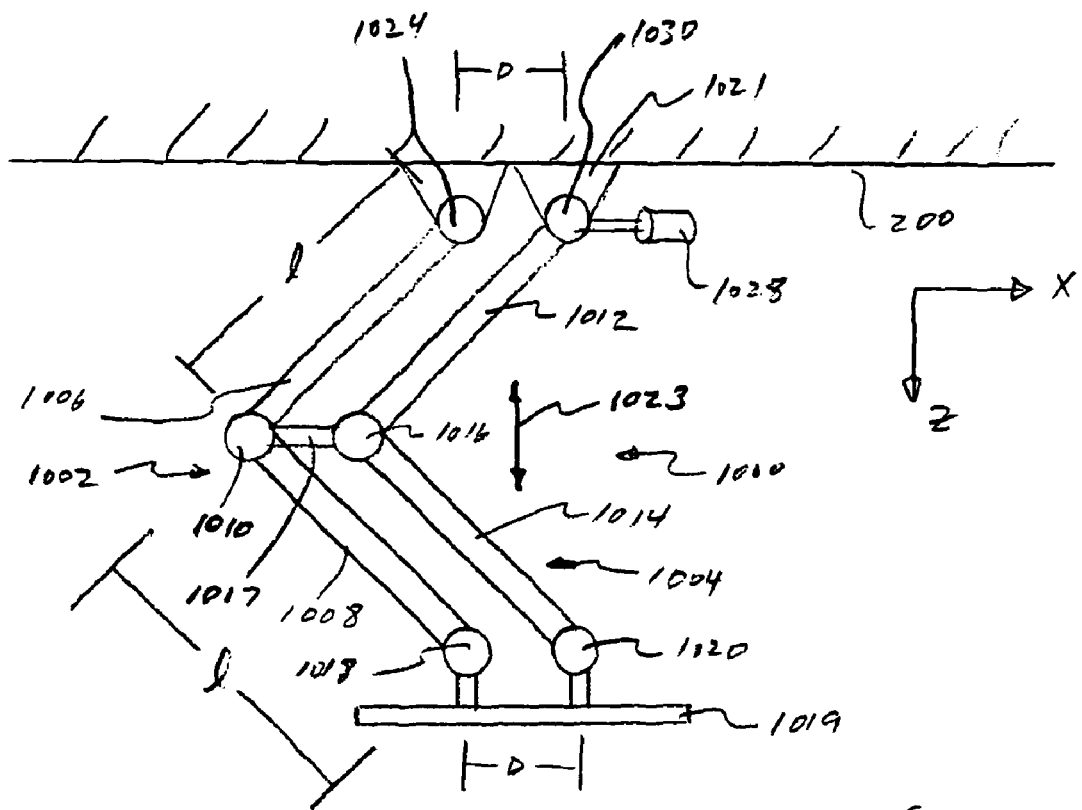
FIG. 10 shows a top view of yet another motorized mount system in an extended position.

FIG. 10 shows a motorized wall mount system 1000 capable of adjusting the viewing angle of a monitor. The motorized mount system 1000 includes a first arm 1002 and a second arm 1004, which may be symmetrical with respect to each other. The first arm 1002 includes a rear-arm 1006 and a forearm 1008, which are pivotably coupled to each other along a pivot joint 1010. Similarly, the second arm 1004 includes a rear-arm 1012 and a forearm 1014, which are pivotably coupled to each other along a pivot joint 1016. The length of the rear-arms 1006 and 1012 and the forearms 1008 and 1014 may be substantially the same.

The proximal end 1024 of the arm 1002 and the proximal end 1030 of the arm 1004 may be pivotably coupled to the reference plane 200 through a bracket 1021. The reference plane 200 may be a wall, for example. The proximal end 1030 of the second arm 1004 may be coupled to a motor 1028 that can rotate the proximal end 1030 along the XZ plane. A link 1017 may be provided between the two pivoting joints 1010 and 1016 to separate the two arms 1002 and 1004. The two arms 1002 and 1004 may be joined together at there respective distal ends 1018 and 1020, by a back plate 1019.

Figure 11:
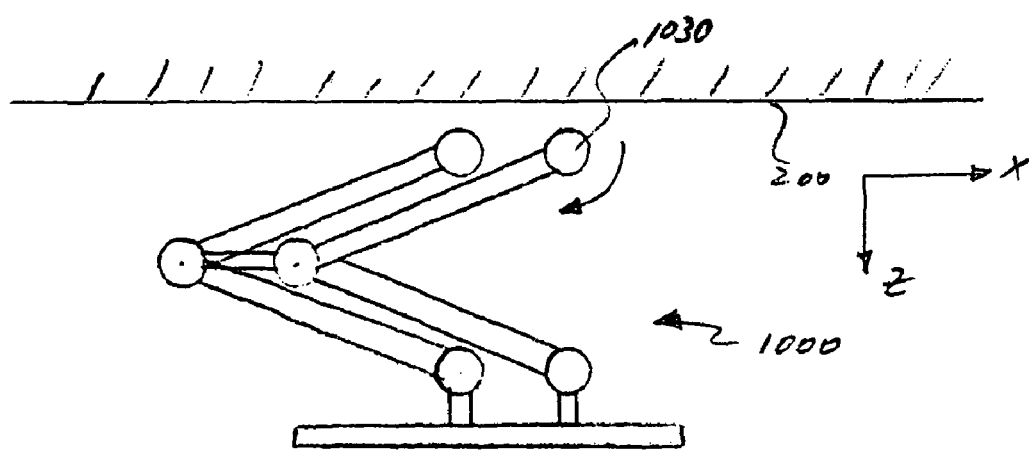
FIG. 11 shows a top view of the motorized mount system of FIG. 10 in a retracted position.

The distance between the distal ends 1018 and 1020 and the distance between the proximal ends 1024 and 1030 may be substantially the same as the length of the link 1017 such that the two arms 1002 and 1004 may be substantially parallel with respect to each other. With the above configuration, the distal ends 1018 and 1020 of the system 1000 may be extended or retracted in a substantially perpendicular manner relative to the reference plane 200, as indicated by the double ended direction arrow 1023. For instance, FIG. 11 shows that the motorized wall mounting system 1000 can retract towards the reference plane 200 by activating the motor 1028 to rotate the proximal end 1030 in a clockwise direction, and vice versa.

Figure 12:
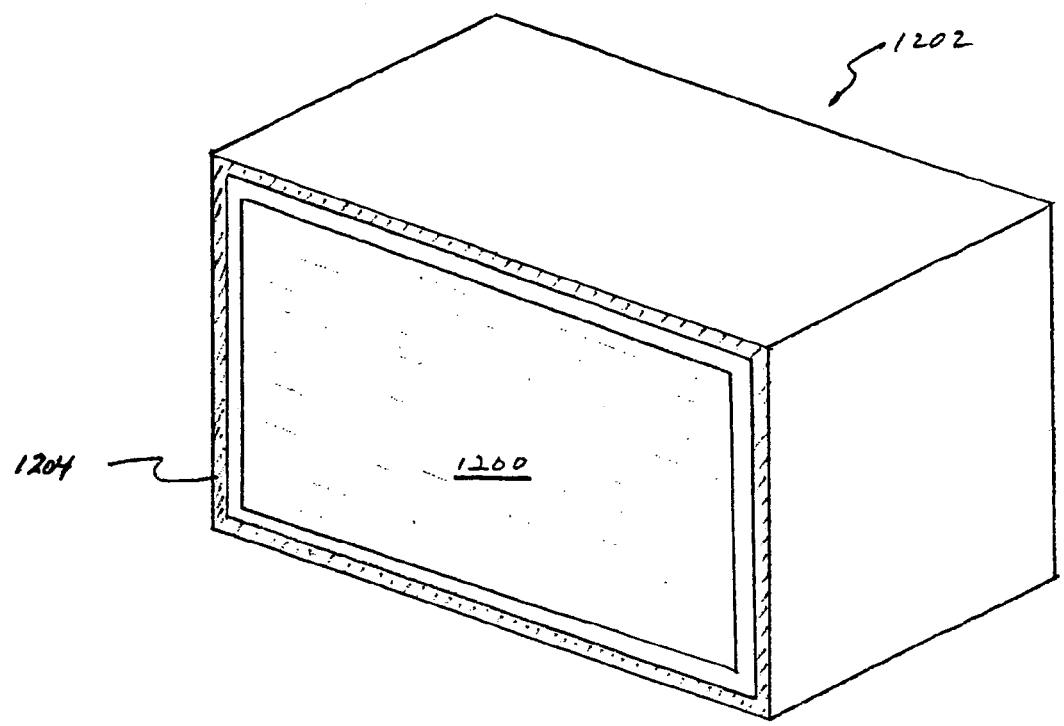
FIG. 12 shows a perspective view of a cabinet housing a monitor in an extended position.
Figure 13:
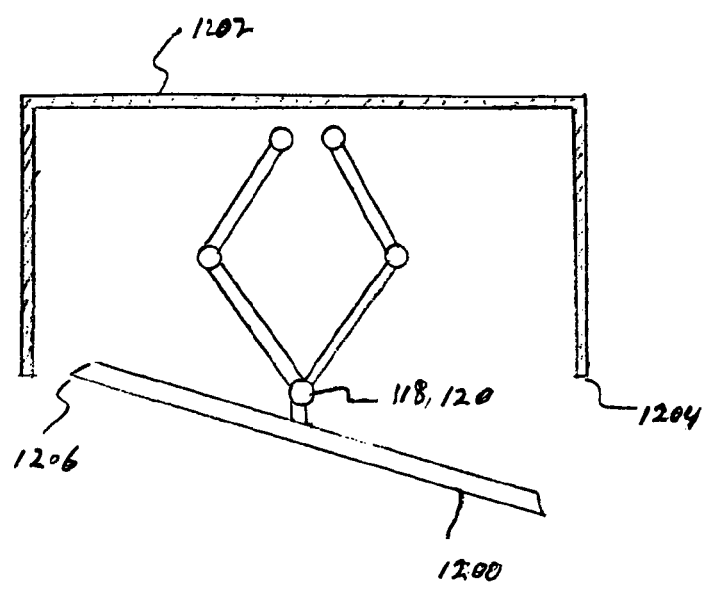
FIG. 13 shows a top cross-sectional view of FIG. 12 illustrating the monitor swiveled to the left.

FIG. 12 shows a monitor 1200 mounted within a cabinet 1202 where a motorized mount system, as discussed above, may extend the monitor 1200 so that it is substantially flush with the front side 1204 of the cabinet 1202. The cabinet may be a wall entertainment unit. In reference to FIG. 5, if a viewer uses the remote control 502 to swivel the monitor 1200 to the left, then the control 506 may extend and swivel the monitor 1200 relative the cabinet 1202 so that the left side 1206 of the monitor 1200 may be at least flush with the front side 1204 of the cabinet. This way, the monitor may be viewed by a viewer even when sitting on the left side of the cabinet 1202 without being impeded by the left side of the cabinet. Likewise, the control 506 may extend the monitor from the cabinet to tilt the monitor so that the monitor may be viewed without being impeded by the cabinet.

Figure 14:
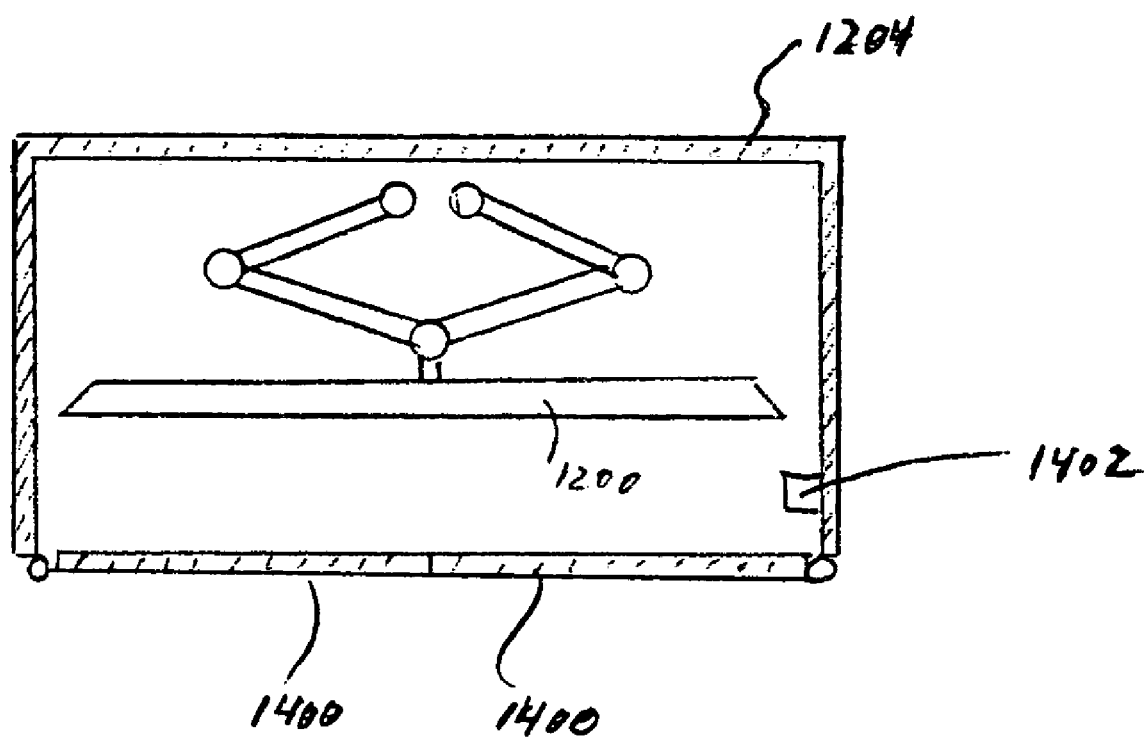
FIG. 14 shows a top cross-sectional view of a monitor in a retracted position when the doors of the cabinet are closed.

FIG. 14 shows the monitor 1200 in the retracted position within the cabinet 1204 when the monitor is turned off. In some applications, the cabinet 1204 may have a pair of doors 1400 to hide the monitor 1200 within the cabinet 1204. As the doors are opened, a sensor 1402 may be triggered to detect that the doors are now opened. The sensor 1402 may be communicably coupled to the control 506, see FIG. 5, to communicate to the control 506 that the doors 1400 are opened. The control 506 may then activate the motor 128 to automatically extend the monitor 1200 so that it is flush or further extended from the front side 1204 of the cabinet. Conversely, when the doors are closed by the viewer, the control 506 may automatically retract the monitor 1200 within the cabinet.

Alternatively, motors 1402 may be coupled to the hinges for the one or more doors 1400 to open and close the doors through a remote control. The control 506 may operate the motors 1402, and based on the control signal from the remote control, the control 506 may operate the motors 1402 to open and close the doors. For instance, based on the open door signal, the control 506 may operate the motors 1402 to open the doors 1400 and then active the motorized mount system to extend the monitor from the cabinet 1204. On the other hand, based on the closed door signal, the control 506 may activate the mount system to retract the monitor and then operate the motors 1402 to close the doors 1402. Note that it is within the scope of this invention to open and close one door or any other closing mechanism in front of the cabinet 1204.

Figure 15:
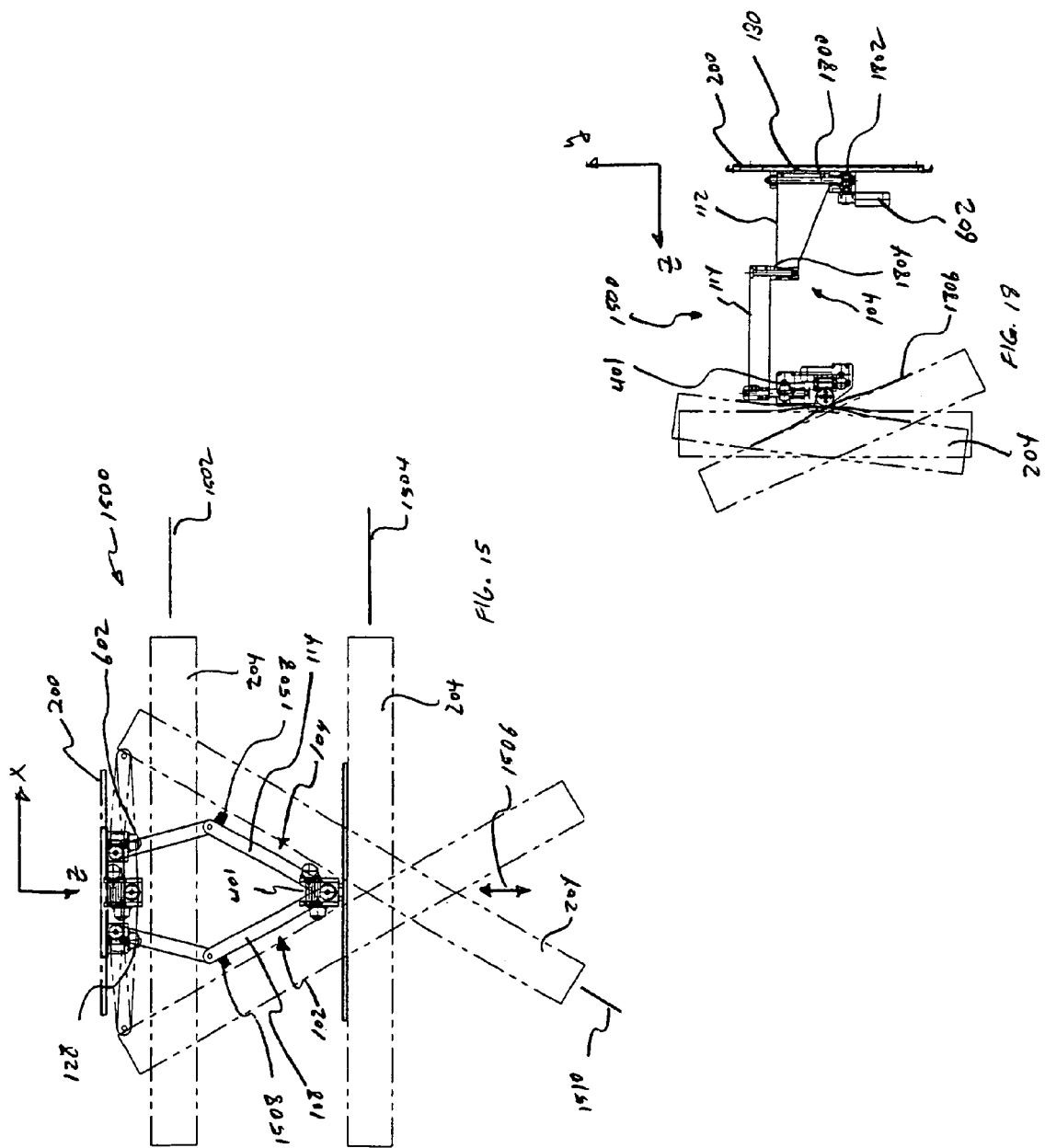
FIG. 15 is a top view of another motorized mount system.

FIG. 15 shows a top view of a motorized wall mount system 1500 illustrating moving the monitor 204 from a retracted position 1502 to an extended position 1504 relative to a reference plane 200. The system 1500 may include the first motor 128 and the fourth motor 602 such that the space between the two motors 128 and 602 is wide enough to allow the gear housing 401 to fit between the two motors 128 and 602. With the gear housing 401 fitting between the two motors, the gear housing 401 may be substantially flush against the reference plane 200 when the mount system 1500 is in the retracted position so that the distance between the monitor 204 and the reference plane 200 may be minimized.

FIG. 15 shows that each of the first and second arms 102 and 104 may be provided with a limit switch 1508 at their respective forearms 108 and 114. The limit switches may be communicably coupled to the control 506 where actuation of any one of the limit switches may cause the control 506 to interrupt the power, if any, provided to the motors to stop the mount system 1500 from moving. The limit switches may be positioned along the forearms 108 and 114 so that once the monitor 204 has reached its limited movement, the back side of the monitor 204 may activate the limit switch to stop the mount system 1500 from moving. For instance, FIG. 15 shows that the mount system 1500 is able to either extend or retract the monitor 204 substantially along the Z-axis as indicated by the direction arrow 1506 between positions 1502 and 1504. Once the monitor 204 is in the extended position 1504, the mount system 1500 may swivel the monitor 204 to the counter-clockwise direction 1510 which may be the maximum counter-clockwise swivel movement when the monitor has been extended to the position 1504. As the backside of the monitor 204 activates the limit switch 1508, the control 506 can detect the activation of the limit switch 1508 and stop the mount system 1500 from moving to avoid damaging the monitor 204 and the mount system 1500. In addition, the limit switch 1508 may be positioned along the forearms 108 and 114 to stop the left and right side of the monitor 204 from hitting wall (as defined by the reference plane 200) while swiveling the monitor from side to side.

Figure 16:
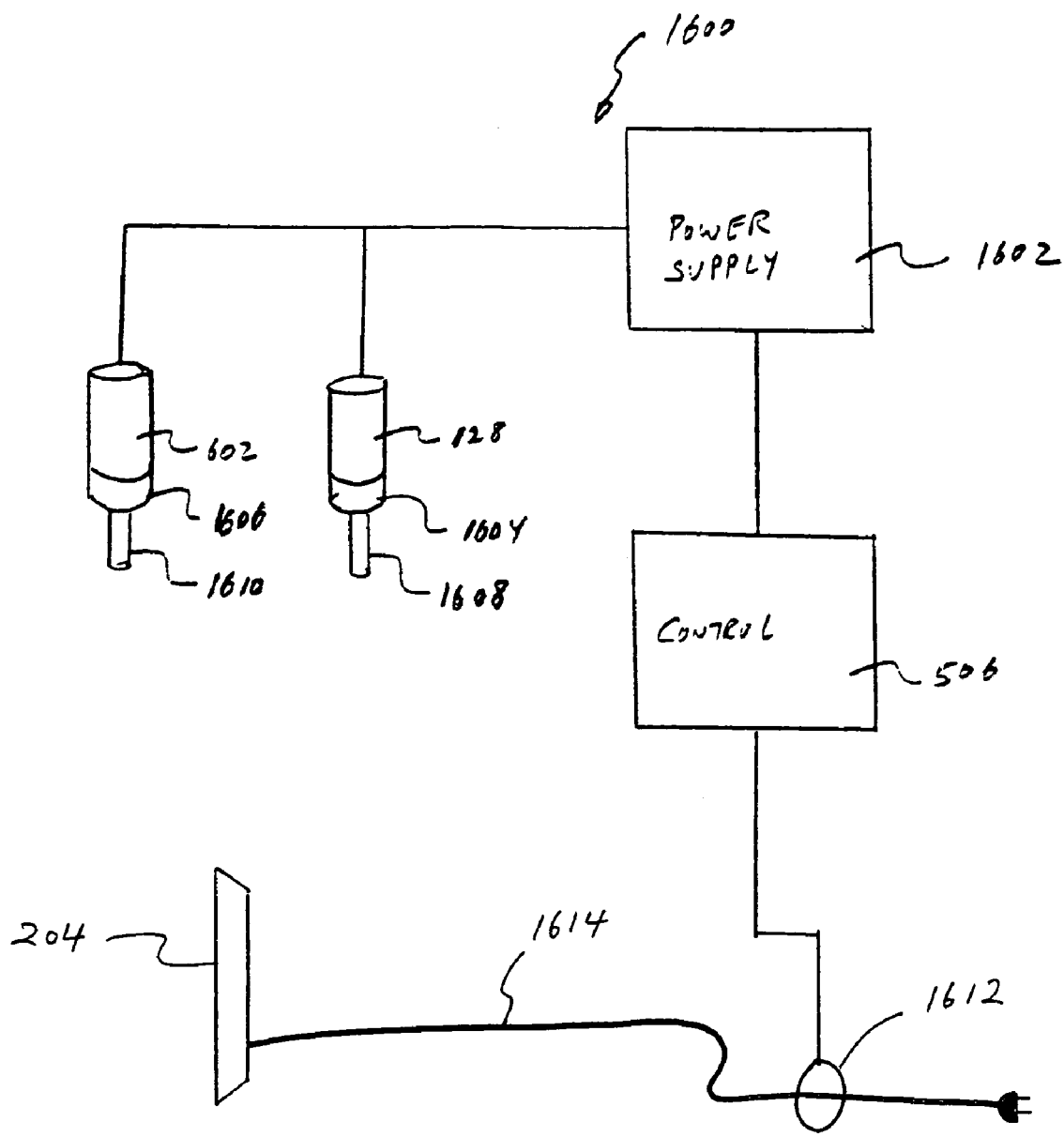
FIG. 16 is a control diagram of a sensor to monitor the current through the power cord of the monitor.

FIG. 16 shows a circuit diagram 1600 capable of extending and retracting the monitor 204 substantially along the Z-axis. The circuit diagram may include a power supply 1602 to provide power to the motors 128 and 602. In order to extend and retract the monitor 204 in substantially along the Z-axis, the motors 128 and 602 need to turn about their respective pivot axis at a substantially similar rate (assuming that the first and second arms 102 and 104 are substantially symmetrical with respect to each other). With the two motors 128 and 602 being substantially similar, the control 506 may turn on and off the two motors and provide the substantially same level of power to the two motors. This may be accomplished, for example, by using the same power supply 1602 to provide power to the two motors 128 and 602 at the same time. This way, substantially the same level of power may be provided to the two motors and can be turned on and off at the same time.

The two motors 128 and 602 may be coupled to their respective gear boxes 1604 and 1606. The two gear boxes 1604 and 1606 may increase the torque by reducing the rpm but rotate in opposite directions with respect to each other. Extending from the two gear boxes 1604 and 1606 are their respective shafts 1608 and 1610. The two shafts 1608 and 1610 are coupled to their respective proximal ends 124 and 130 of the first and second arms 102 and 104, respectively, to extend and retract the monitor 204. The motors 128 and 602 may be DC motors operating at 24V. As such, the power supply 1602 may convert AC provided from the electrical outlet to 24V DC. Note that other methods of rotating the shafts 1608 and 1610 known to one skilled in the art are within the scope of this invention. For instance, the power supply 1602 may also provide substantially the same power to the two motors 128 and 602 but in opposing polarity to rotate the two motors in opposite directions with respect to each other.

FIG. 16 also shows that the control 506 may be communicably coupled to a current sensor 1612 that detects power or current conducted through the power cord 1614 of the monitor 204. When the monitor 204 is powered on, current conducts through the power cord 1614; however, when the monitor 204 is off, the current conducting through the power core 1614 is nominal, if any. The current sensor 1612 detects whether there is current conducting through the power cord 1614, and passes this information to the control 506. If the control 506 detects current conducting through the power cord 1614, then the control 506 controls the two motors 128 and 602 to extend the monitor to a predetermined extended position. On the other hand, if the control 506 does not detect current or nominal current conducting through the power cord 1614, then the control 506 controls the two motors 128 and 602 to retract the monitor to a predetermined retracted or home position. This way, the motorized mount systems, discussed above, can automatically extend and retract the monitor when it is on and off, respectively, without having to separately turn on or off the motorized mount system.

FIG. 17 shows a front view of the mount system 1500 where the motors 128, 602, 1700, and 1702 may be arranged substantially along the Y-axis. The two motors 1700 and 1702 are mounted to the gear housing 401 adapted to swivel and tilt the monitor 204 as discussed in more detail below. In particular, with the two motors 1700 and 1702 arranged in substantially vertical manner, the overall width of the gear housing 401 or distance between the two motors 1700 and 1702 may be minimized so that they can fit between the proximal ends 124 and 130 of the first and second arms 102 and 104, respectively, when the mounting system 1500 is in a retracted position.

The FIG. 18 shows a side view of the four motors 128, 602, 1700, and 1702 arranged substantially along the Y axis. The proximal end 130 of the second arm 104 has a shaft 1800 that is pivotably coupled to the reference plane 200. One end of the shaft 1800 has a gear wheel 1802 where rotation of the gear wheel 1802 causes the shaft 1800 and the proximal end 130 of the second arm 103 to rotate. Note that in reference to FIG. 6, the location of the shaft 1802 may be in line with the pivot axis 134. The motor 602 may have a worm screw 1704 (shown in FIG. 17) that engages with the gear wheel 1802 so that control 506 may activate the motor 602 to rotate the proximal end 130 either in the clockwise or counter-clockwise direction around the Y-axis. The proximal end 124 of the first arm 102 may have a substantially similar mechanism as the proximal end 130 of the second arm 104 to rotate the proximal end 124 in clockwise or counter-clockwise direction along its pivot axis 126.

FIG. 18 shows the mounting system 1500 having a rear-arm 112 and a forearm 114 coupled together by a hinge 1804. Note that another motor may be incorporated into the hinge 1804 to assist the motor 602 in extending and retracting the monitor 204. In addition, the gear housing 401 may be coupled to an adapter plate 1806 that is adapted to attach to the backs side of the monitor 204.

FIG. 19 is an enlarged top view of the mounting system 1500 showing the gear housing 401 coupled to the adapter plate 1806. The gear housing 401 has the motors 1700 and 1702 adapted to swivel and tilt the adapter plate 1806, respectively. The motor 1702 has a gear box 1900 with a shaft 1902 that extends from the gear box 1900 at about 90 degrees relative to the longitudinal axis of the motor 1702. The shaft 1902 is attached to a worm screw 1904 that is engaged with the second worm wheel 416 (see FIG. 4). The shaft 400 (see FIG. 4) extends from the center of the second worm wheel 416 and may be locked together so that the shaft 400 may not rotate relative to the second worm wheel 416. The motor 1702 and the worm screw 1904 may be coupled to the gear housing 401 such that as the worm screw 1904 rotates in relation to the second worm wheel 416, the gear housing 401 rotates relative to the shaft 400 along the XZ plane.

FIG. 20 is an enlarged side view of the gear housing 401 of the mounting system 1500. FIG. 20 shows the worm screw 1904 engaged with the second worm gear 416 which is attached to the shaft 400 for swiveling the adapter plate 1806, as discussed above in reference to FIG. 19. FIG. 20 also shows the motor 1700 having a gear box 2000 attached to a worm screw 2002. The worm screw 2002 may be engaged with a worm wheel 2004 which in turn may be engaged with a titling worm wheel 2006 that is attached to the adapter plate 1806. To tilt the adapter plate 1806 along the YZ plane, for example, the control 506 may activate the motor 1700 where the rotating motion of the gear screw 2002 is transferred to the tilting worm wheel 2006 by the worm wheel 2004. Once the control 506 stops the motor 1700 from tilting, the worm gear mechanism, as discussed above, may hold the adapter plate attached to the monitor in its place.

Figure 21:
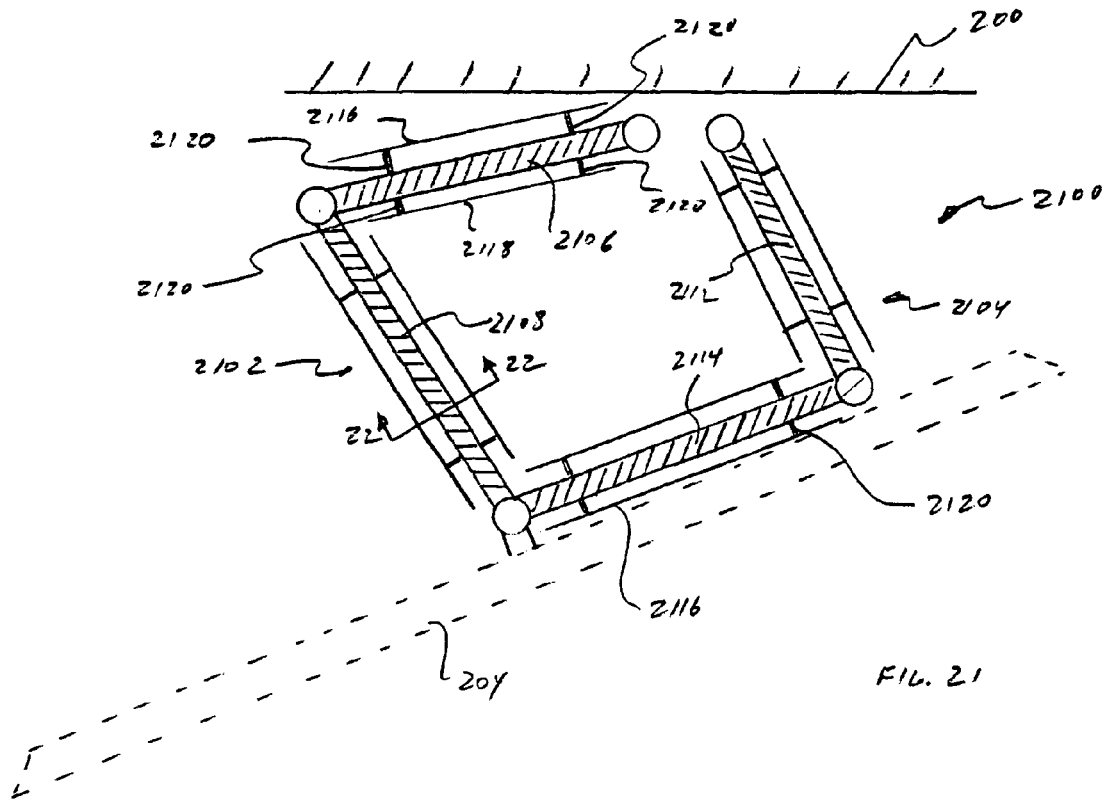
FIG. 21 is a top view of the motorized mount system of FIG. 15 with covers.

FIG. 21 shows a top view of a motorized mount system 2100. The mounting system 2100 includes a first arm 2102 having a rear arm 2106 and a forearm 2108, and a second arm 2104 having a rear arm 2112 and a forearm 2114, similar to the mounting system discussed in reference to FIG. 6. With the mounting system 2100, at least a portion of the first and second arms 2102 and 2104 may be provided with a cover. For example, the rear arm 2106 may have an outer cover 2116 and an inner cover 2118 on the exposed side and the inner side of the rear arm 2106, respectively. The rear arm 2106 may have pressure sensitive sensors 2120 to hold the covers 2116 and 2118 away from the rear arm 2106 so that space is provided between the rear arm 2106 and the covers 2116 and 2118. The pressure sensitive sensors 2120 may be communicably coupled to the control 506 (see FIG. 5) so that if pressure is applied to one of the covers 2116 and 2118, the pressure sensitive sensor 2120 detects the pressure and communicates to the control that pressure has been detected. The control 506 may then interrupt the power, if any, provided to the motors to stop the mounting system 2100 from moving.

FIG. 21 shows that the rear arm 2112 and forearms 2108 and 2114 may be provided with the outer and inner covers 2116 and 2118 and pressure sensitive sensors 2120 as well to detect pressure applied to the covers. For instance, FIG. 21 shows the monitor 204 swiveled to the counter-clockwise direction where the back side of the monitor 204 may apply pressure to the outer cover 2116 attached to the forearm 2114. The pressure sensitive sensor 2120 on the forearm 2114 detects the pressured applied to the outer cover 2116 and communicates with the control 506 that pressure has been detected. The control 506 may then interrupt the power provided to the motors to stop the mounting system 2100 from moving. This way, the mounting system 2100 may automatically stop the monitor from moving once mounting system 2100 has reached its limit with regard to swivel movement. As another example, if a person accidentally touches any one of the covers, the mounting system 2100 can stop to avoid injuring the person.

Figure 22:
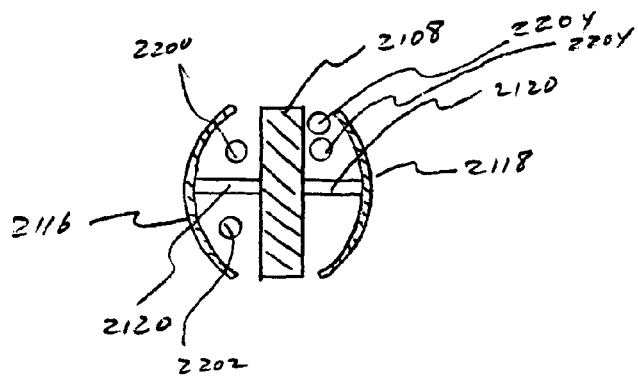
FIG. 22 is a cross-sectional view along the line 22 of the motorized mount system of FIG. 21.

FIG. 22 shows a cross-sectional view along the line 22 of FIG. 21. The cross-sectional view shows the forearm 2108 between the outer cover 2116 and the inner cover 2118. Coupling the outer and inner covers to the forearm are pressure sensitive sensors 2120. The outer and inner covers 2116 and 2118, respectively, may be releasably coupled to the pressure sensitive sensors 2120 so that they can be removed. This way, a user can replace the covers with its desired color and/or design for a custom look. In addition, the outer and inner covers 2116 and 2118 may be spaced apart from the forearm 2108 so that a power cord 2200, video cable 2202, and audio cables 2204, etc may be passed through the space between the forearm 2108 and the covers 2116 and 2118. This way, the power cord and cables may be hidden within the covers 2116 and 2118.

Figure 23:
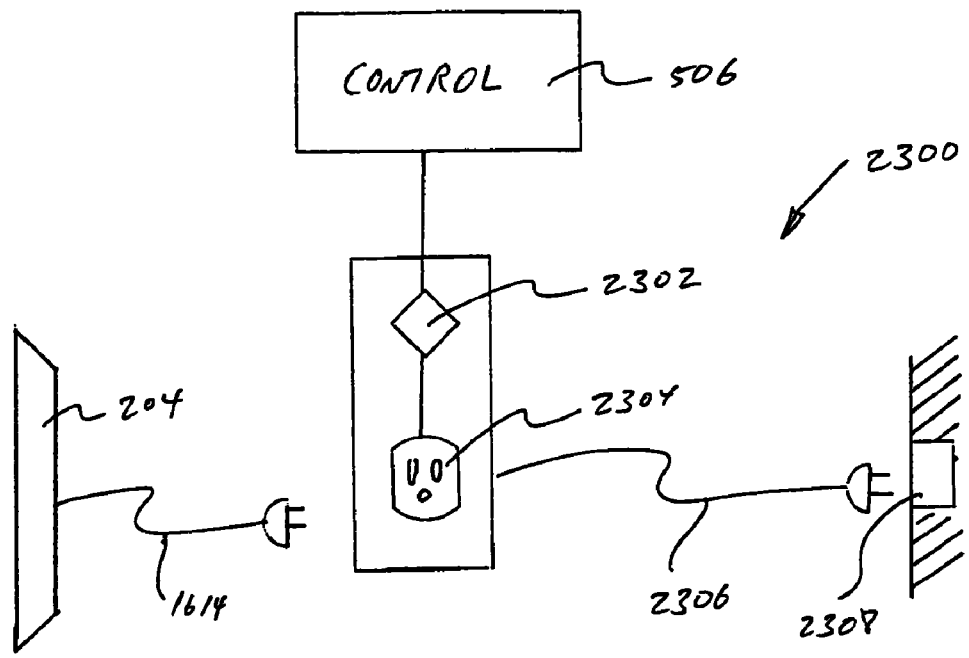
FIG. 23 is a control block diagram that detects whether a monitor is on or off.

FIG. 23 is a control block diagram 2300 where the control 506 may detect whether the monitor 204 is turned on or off to automatically extend the monitor 204 if the monitor is turned on, and retract the monitor 204 if the monitor is turned off. The control block 2300 includes a current sensor 2302 electrically coupled to an electrical outlet 2304. The current sensor 2302 can detect whether current is being drawn through the electrical outlet 2304 or not. The electrical outlet 2304 is provided with a power cord 2306 to connect to an external electrical outlet 2308 such as from a home's wall electrical outlet. As such, the control block diagram 2300 of a motorized mount system may provide the electrical outlet 2304 so that the power cord 1614 of the monitor 204 may be connected to the electrical outlet 2304 rather than to the electrical outlet 2308 of the home.

The control block diagram 2300 allows the control 506 to detect whether the monitor 204 is turned on or off by detecting whether current or power is drawn through the electrical outlet 2304 or not because when the monitor 204 is on, the monitor 204 draws current or power from the electrical outlet 2304, but when the monitor is turned off, then the monitor stops drawing current from the electrical outlet 2304. If the control 506 detects that the monitor 204 is on, then the control 204 may extend the monitor 204 to a predetermined extended position, but when the monitor 204 is off, then the control 204 may retract the monitor 204 to a predetermined retracted position. Accordingly, as a viewer turns on the monitor 204, and the motorized mount system may automatically extend the monitor 204 to a desired predetermined extended position without having to separately activating the motorized mount system to extend the monitor 204, and when the viewer turns off the monitor 204, the motorized mount system automatically retracts the monitor 204 to the predetermined retracted position.

Figure 24:
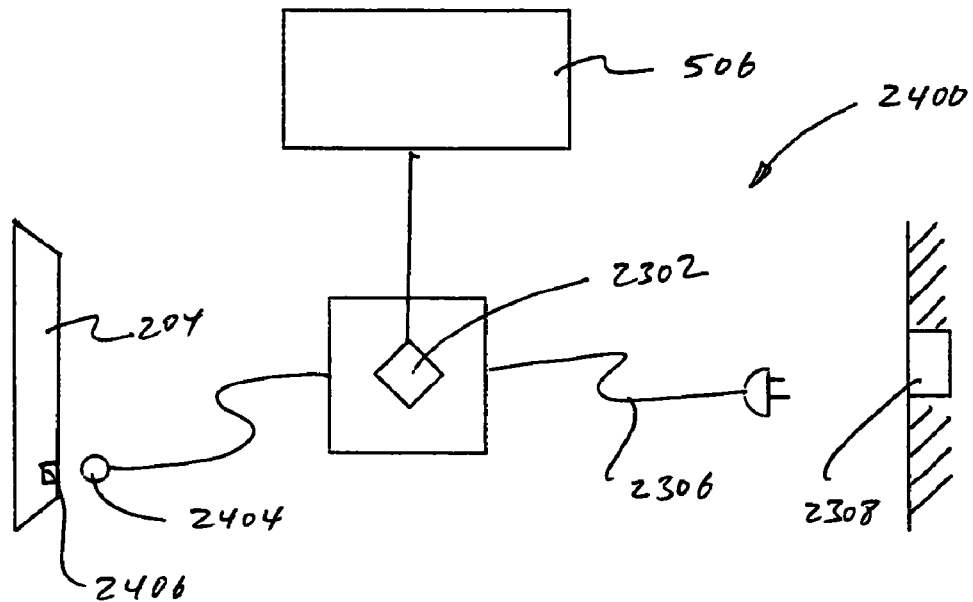
FIG. 24 is another control block diagram to detect whether a monitor is on or off.

FIG. 24 shows a control block diagram 2400 adapted to automatically extend and retract the monitor when it is on and off, respectively, without having to separately turn on or off the motorized mount system. The control 506 is communicably linked to the current sensor 2302 that is provided with the power cord 2306 and a monitor power cord 2402. The power cord 2306 is adapted to connect to the home's electrical outlet 2308. The distal end or female end 2404 of the monitor power cord 2402 is adapted to connect to the electrical connection point 2406 of the monitor 204. As such, rather than using the power cord 1614 provided with the monitor 204, the monitor power cord 2402 may be used to connect to the monitor 204 so that the current sensor 2302 may detect whether the monitor is on or not.

Figure 25:
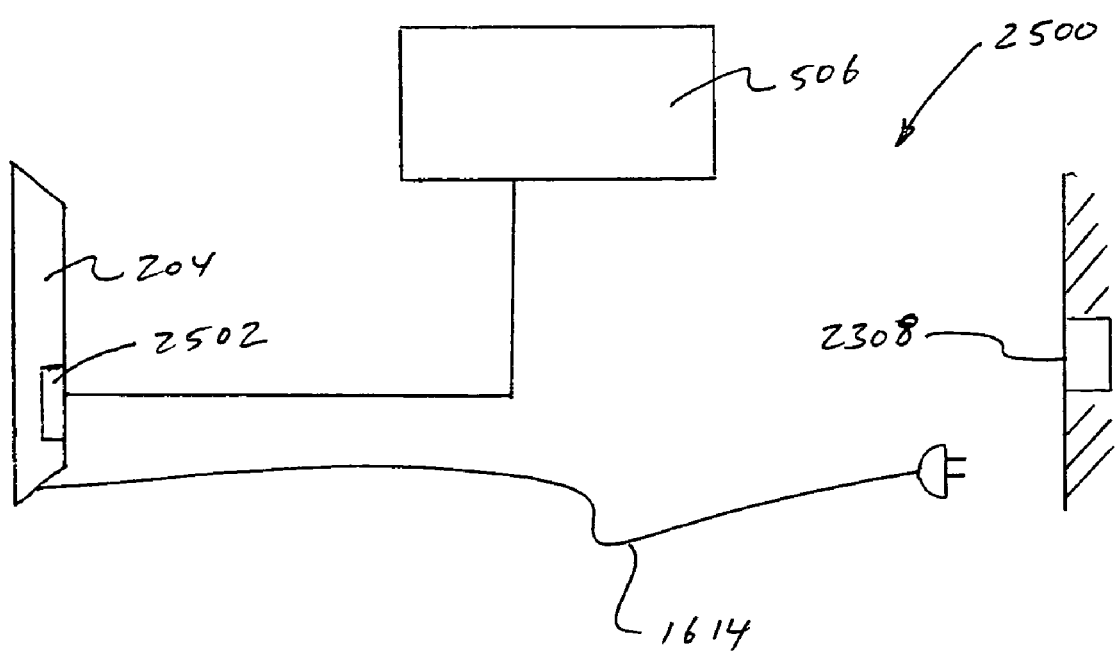
FIG. 25 is yet another control block diagram to detect whether a monitor is on or off.

FIG. 25 shows a control block diagram 2500 where the control 506 may be communicably linked to the data output interfaces 2506 of the monitor. The power cord 1614 may be connected directly to the electrical outlet 2308 of the home. Most monitors provide video and/or audio outputs to drive external devices such as speakers. In general, the monitors provide output data such as video and audio signals through their respective video and/or audio output interfaces 2502 when the monitor 204 is only on. The control 2506 may be communicably linked to one or more of the output interfaces 2502 to determine if output signals are provided to determine if the monitor 204 is turned on or off, and extend and retract the monitor 204 accordingly. Note that besides video and audio output interfaces, the control may be communicably linked to RS-232 interface of the monitor to determine whether the monitor is on or off.

FIG. 26 shows a gear system 2600 adapted to utilize a first motor 2602 and a second motor 2604 to roll and/or pitch a main shaft 2606 along the XY plane. The gear system 2600 may be used to tilt and swivel a monitor as described in more detail below. The gear system 2600 includes a first gear 2608 and a second gear 2610. The first motor 2602 is coupled to the first gear 2608, and the second motor 2604 is coupled to the second gear 2610. The gear system 2600 also includes a third gear 2612 that is coupled to the main shaft 2606 such that rotation of the third gear causes the main shaft 2606 to rotate as well. The gear system 2600 may also include a fourth gear 2614 between the first and third gears 2608 and 2612, and a fifth gear 2616 between the second and third gears 2610 and 2612.

The third gear 2612 may have a ring 2618 with an opening. The ring 2618 may be rotatably coupled to the third gear 2612 to allow the third gear 2612 to rotate about the longitudinal axis of the main shaft 2606. For instance, a bearing may be used between the third gear 2612 and the ring 2618 to allow the third gear 2612 to rotate. A shaft 2620 may be coupled to the fourth and fifth gears 2614 and 2616 and pass through the opening of the ring 2618. The gears described above may be bevel gears with teeth cut on a cone shape to transmit rotary motion and torque with respect to each other. With the gear system 2600 described above, when the two motors 2602 and 2604 rotate their respective first and second gears 2608 and 2610 in the same rotational direction in substantially the same rate, the fourth and fifth gears 2614 and 2616 rotate in opposite directions to cause the third gear 2612 to roll as illustrated in FIG. 27. The direction of the roll depends on the rotational direction of the two gears 2608 and 2610.

Conversely, when the two motors 2602 and 2604 rotate their respective first and second gears 2608 and 2610 in the opposite rotational direction in substantially the same rate, the fourth and fifth gears 2614 and 2616 rotate in the same rotational direction to cause the third gear 2612 to pitch as illustrated in FIG. 28. The direction of the pitch depends on the rotational direction of the two gears 2608 and 2610.

With the above gear system 2600, both motors 2602 and 2604 work together or in parallel to roll and pitch the main shaft 2606 rather than having one motor for rolling and another motor for pitching movements. In addition, with the two motors 2602 and 2604 may be positioned parallel with respect to each other such that the depth of the housing enclosing the two motors may be minimized.

FIG. 29 shows a housing 2900 enclosing the gear system 2600 adapted to swivel and tilt a monitor 204. A neck 2902 may be provided between the housing 2900 and the monitor 204 with one end of the neck 2902 coupled to the main shaft 2606 and the other end of the neck adapted to couple to the back side of the monitor 204. With the neck 2902 coupled to the main shaft 2606, the monitor 204 may be swiveled by rolling the shaft 2606 as discussed above in reference to FIG. 27. In addition, the monitor 204 may be tilted by pitching the shaft 2606 as discussed above in reference to FIG. 28. In particular, with both motors 2602 and 2604 working together to lift or tilt the monitor 204, a heavier monitor 204 may be tilted.

Figure 30:
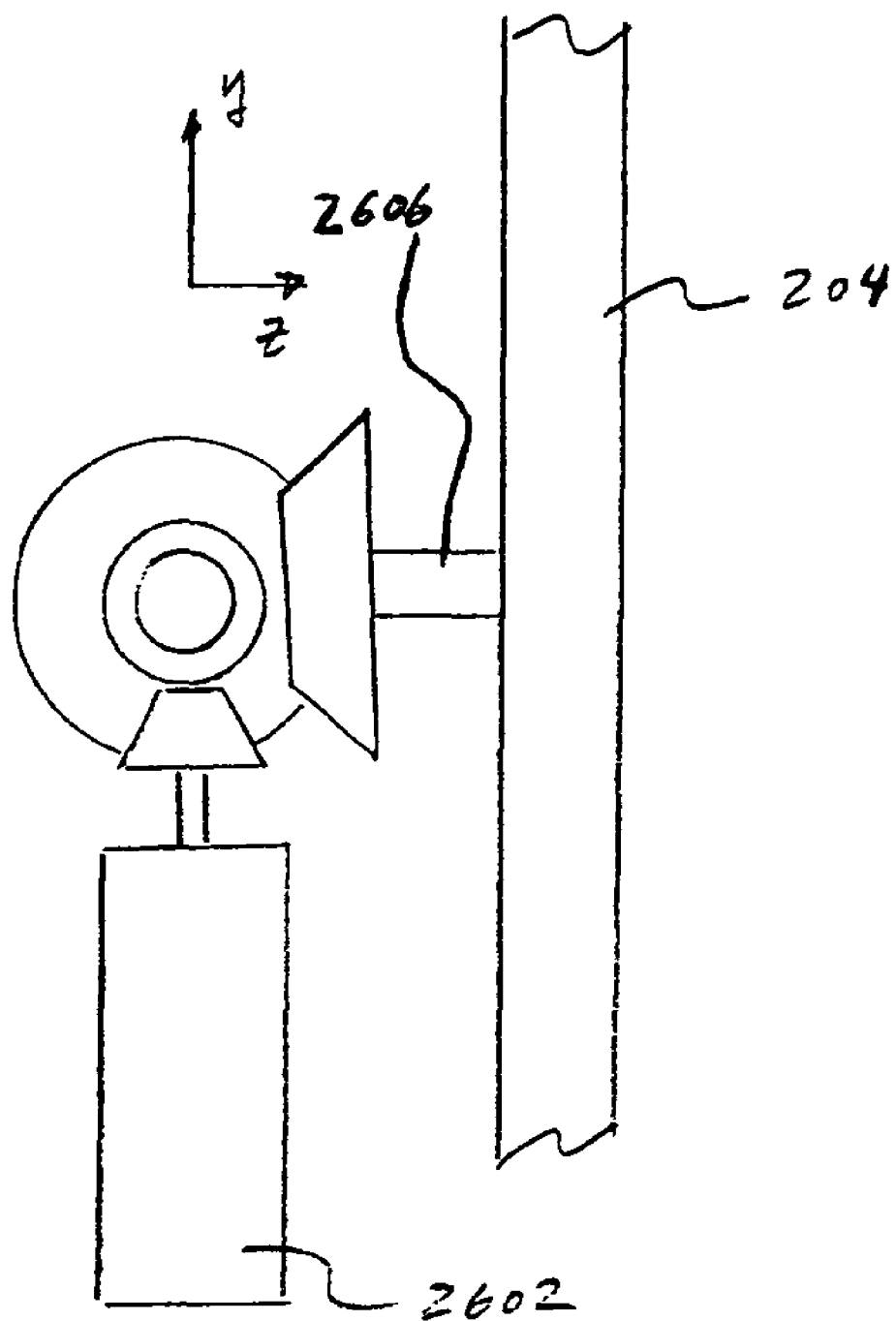
FIG. 30 is a side view of the gear system of FIG. 26 illustrating turning a monitor.

FIG. 30 shows a side view of the gear system 2600 where the main shaft 2606 is perpendicular to the longitudinal axis of the first motor 2602. In this embodiment, by rolling the main shaft 2606 as illustrated above in FIG. 27, the monitor 204 may be turned from landscape to portrait or vice versa, for example. In addition, the monitor 204 may be tilted as illustrated above in FIG. 28. Alternatively, the gear system 2600 may be coupled to the monitor to turn and swivel the monitor by providing the motors so that the longitudinal axes of the two motors are along the X-axis in FIG. 30.

FIG. 31 shows a perspective view of a motorized mount system 3100 adapted to move the monitor 204 between a retracted position and an extended position 3102 relative to a reference plane 200 in reference to X, Y, Z axes. The system 3100 includes a first pair of arms 3104 and a second pair of arms 3106. The first pair of arms 3104 may be on top of the second pair of arms 3106.

The first pair of arms 3104 may be substantially similar to the pair of arms system 100 discussed above in reference to FIG. 2. The first pair of arms 3104 includes a first rear arm 104 pivotably coupled to a first fore arm 108 along the pivot axis 110. The first rear arm 104 has a first proximal end 124 and the first fore arm has a first distal end. The first pair of arms 3104 also includes a second arm 104 having a second rear arm 112 pivotably coupled to a second fore arm 114 along the pivot axis 116. The second rear arm 112 has a second proximal end 130 and the second fore arm 114 has a second distal end 120. The first and/or second distal ends 118 and 120 may be pivotably coupled to the adapter plate 3102. The first and second proximal ends 124 and/or 130 may be pivotably coupled to the base plate 200. Each of the first and second proximal ends 124 and 130 may be coupled to a motor to rotate the proximate end about their respective pivot axes.

The two proximal ends 124 and 130 may be motorized to cause the distal ends 118 and 120 to extend and retract relative to the base plate 200. As illustrated in FIG. 31, the distal ends 118 and 120 may be coupled to a sliding mechanism 3108 to allow the distal ends 118 and 120 to slide up and down substantially along the Y-axis.

The second pair of arms 3106 includes a third rear arm 106' pivotably coupled to a third fore arm 108' along the pivot axis 110'. The third rear arm 106' has a third proximal end 124' and the third fore arm has a third distal end 118'. The second pair of arms 3104 also includes a fourth arm 104' having a fourth rear arm 112' pivotably coupled to a fourth fore arm 114' along the pivot axis 116'. The fourth rear arm 112' has a fourth proximal end 130' and the fourth fore arm 114' has a fourth distal end 120'. The third and/or fourth distal ends 118' and 120' may be pivotably coupled to the adapter plate 3102. The third and fourth proximal ends 124' and/or 130' may be pivotably coupled to the base plate 200. Each of the third and fourth proximal ends 124' and 130' may be coupled to a motor to rotate the proximate end about their respective pivot axes.

As discussed above, the second pair of arms 3106 may be substantially similar to the motorized mount system 100 discussed above in reference to FIG. 2 so that the two proximal ends 124' and 130' may be motorized to cause the distal ends 118' and 120' to extend and retract relative to the reference plane 200. The distal ends 118' and 120' may be coupled to a motor 3110 to cause the monitor 204 to swivel left and right along the XZ plane.

Figure 32:
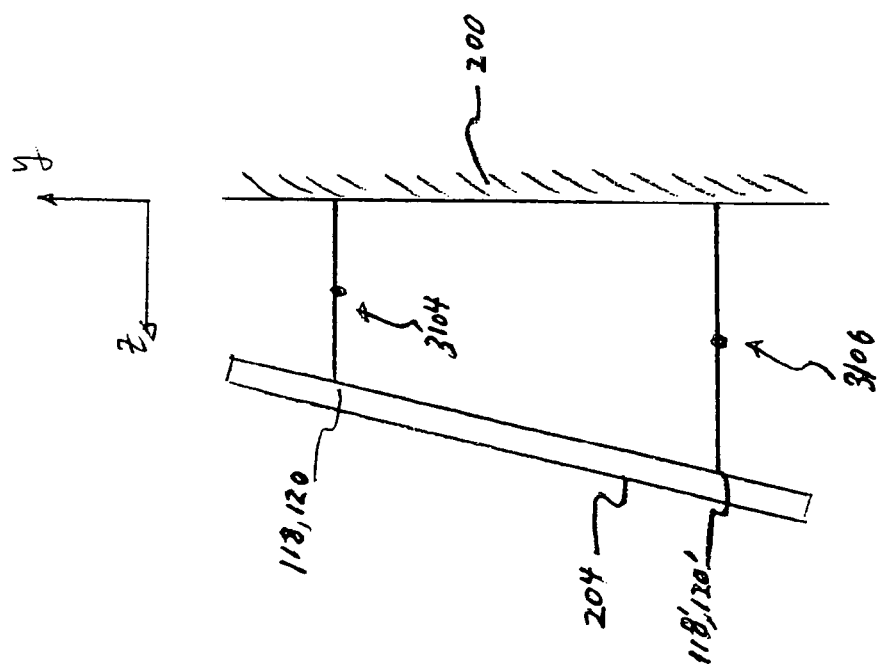
FIG. 32 is a side view of the motorized mount system showing a monitor in a tilt upward position.

FIG. 32 shows a side view of the motorized mount system 3100 where the second pair of arms 3106 is extended further than the first pair of arms 3104. This causes the monitor 204 to tilt in a clockwise direction along the YZ plane. Note that with the titling of the monitor 204, the distance between the distal ends 118 and 120, and 118' and 120' is longer so that the distal ends 118 and 120 slide up the sliding mechanism 3108 to compensate for the longer distance.

Figure 33:
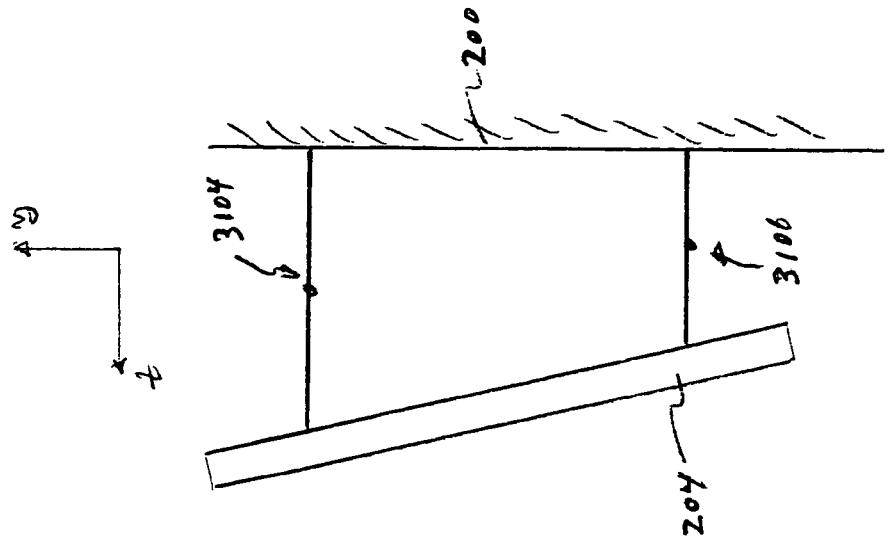
FIG. 33 is a side view of the motorized mount system showing a monitor in a tilt downward position.

FIG. 33 shows a side view of the motorized mount system 3100 where the first pair of arms 3104 is extended further than the second pair of arms 3106. This causes the monitor 204 to tilt in a counter-clockwise direction along the YZ plane. Note that with the sliding mechanism 3108 may be provided with distal ends 118' and 220' of the second pair of arms 3106, and the motor 3110 may be provided with the distal ends 118 and 120 of the first pair of arms 3104. With the two pair of arms 3104 and 3106, a heavier monitor 204 may be supported and the monitor 204 may be tilted by varying the distance between the two pair of arms 3104 and 3106.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A motorized mount system for adjusting viewing angle of a monitor, the system comprising:
   a first arm having a first rear arm pivotably coupled to a first fore arm, the first rear arm having a first proximal end and the first fore arm having a first distal end;
   a second arm having a second rear arm pivotably coupled to a second fore arm, the second rear arm having a second proximal end and the second fore arm having a second distal end, the first and second distal ends adapted to pivotably coupled to a back side of the monitor, and the first and second proximal ends adapted to pivot about their respective axes;
   a first motor coupled to the first proximal end to pivot the first proximal end about its pivot axis to either extend or retract the first and second distal ends relative to the first and second proximal ends; and
   a second motor coupled the first and second distal ends, the second motor mechanically engaged with a tilting mechanism to tilt the monitor when in use.

2. The system according to claim 1, including a third motor coupled the first and second distal ends, the third motor mechanically engaged with a swiveling mechanism to swivel the monitor when in use.

3. The system according to claim 2, including a fourth motor coupled to the second proximal end to pivot the second proximal end about its pivot axis to either extend or retract the first and second distal ends relative to the first and second proximal ends.

4. The system according to claim 3, where the first and fourth motors operate independently.

5. The system according to claim 1, the first and second fore arms having an outer side and an inner side, the outer side of the first and second fore arms having at least one sensor that detects pressure from the back of the monitor to turn off the power to the first motor when the sensor detects the pressure.

6. The system according to claim 1, a cover adapted enclose at least a portion of the first and second arms, a sensor between the cover and the first an second arms to detect pressure applied to the cover to turn off the power to the first motor when the sensor detects pressure.

7. The system according to claim 1, including a control circuit communicably coupled to a current sensor that detects whether current is conducting through a power cord that provides power to the monitor, the control circuit adapted to control the first motor to extend or retract the first and second distal ends, where if the control circuit detects current conducting through the power cord then the control circuit controls the first motor to extend the monitor to a predetermined extended position, and if the control circuit detects no current or nominal current conducting through the power cord, then the control circuit controls the first motor to retract the monitor to a predetermined retracted position.

8. A motorized mount system for adjusting viewing angle of a monitor, the system comprising:
   a base plate adapted to mount to a support structure;
   an adapter plate adapted to support a monitor;
   a first arm having a first rear arm pivotably coupled to a first fore arm, the first rear arm having a first proximal end and the first fore arm having a first distal end;
   a second arm having a second rear arm pivotably coupled to a second fore arm, the second rear arm having a second proximal end and the second fore arm having a second distal end;
   the first and second distal ends pivotably coupled to the adapter plate;
   the first and second proximal ends pivotably coupled to the base plate;
   a first motor coupled to the first proximal end to pivot the first proximal end about its pivot axis to either extend or retract the first distal end relative to the base plate; and
   a second motor coupled the first and second distal ends, the second motor mechanically engaged with a tilting hinge to tilt the monitor when in use.

9. The system according to claim 8, including a third motor coupled to the first and second distal ends, the third motor mechanically engaged with a swiveling wheel to swivel the monitor side to side.

10. The system according to claim 9, including a fourth motor coupled to the second proximal end to pivot the second proximal end about its pivot axis to either extend or retract the first distal end relative to the base plate.

11. The system according to claim 10, where the first and fourth motors operate independently.

12. The system according to claim 8, where the first proximal end is mechanically engaged with the second proximal end so that the first proximal end rotates in opposite direction of the second proximal end at the same rotational speed to cause the first and second distal ends to either extend or retract in a substantially perpendicular direction relative to the base plate.

13. The system according to claim 8, including:
   a third arm having a third rear arm pivotably coupled to a third fore-arm, the third rear arm having a third proximal end and the third fore-arm having a third distal end;
   a fourth arm having a fourth rear arm pivotably coupled to a fourth fore-arm, the fourth rear arm having a fourth proximal end and the fourth fore-arm having a fourth distal end, the third and fourth distal ends pivotably coupled to the adapter plate, and the third and fourth proximal ends pivotably coupled to the base plate; and
   a second motor coupled to the third proximal end to pivot the third proximal end about its pivot axis to either extend or retract the third and fourth distal ends relative to the base plate, where extending the third and fourth distal ends further than the first and second distal ends causes the monitor to tilt in an upward direction, and extending the first and second distal ends further than the third and fourth distal ends causes the monitor to tilt in a downward direction.

14. A motorized mount system adapted to adjust the viewing angle of a monitor, the system including:
   a base plate;
   an adapter plate adapted to couple to the monitor;
   a first pair of arms having a first proximal end and a first distal end, the first proximal end pivotably coupled to the base plate and the first distal end coupled to the adapter plate;
   a first motor coupled to the first proximal end to rotate the first proximal end to either extend or retract the first distal end;
   a second pair of arms having a second proximal end and a second distal end, the second proximal end pivotably coupled to the base plate and the second distal end coupled to the adapter plate;
   a second motor coupled to the second proximal end to rotate the second proximal end to either extend or retract the second distal end, and extending or retracting the second distal end relative to the first distal end causes the monitor to tilt; and
   a third motor coupled the second distal end, the third motor mechanically engaged with a swiveling mechanism to swivel the monitor when in use.

15. The system according to claim 14, where the second pair of arms is below the first pair of arms.

16. The system according to claim 14, where the base plate has an elongated slot, the first distal end coupled to the elongated slot to slide up and down the therein.

17. A motorized mount system adapted to reposition a monitor depending on whether the monitor is on or off, the motorized mount system comprising:
   at least one motor mechanically coupled to the monitor to reposition the monitor between a first position and a second position; and
   a control circuit adapted to activate the at least one motor and detect whether the monitor is on or off, if the monitor is on, then repositioning the monitor from the first position to the second position, and if the monitor is off, then repositioning the monitor form the second position to the first position.

18. The motorized mount system according to claim 17, where the control circuit is communicably link to an output interface of the monitor, and if data is outputted through the output interface, then the monitor is on, and if no data is outputted through the output interface, then the monitor is off.

19. The motorized mount system according to claim 18, where the output interface is a video output of the monitor.

20. The motorized mount system according to claim 18, where the output interface is an audio output of the monitor.

21. The motorized mount system according to claim 17, including a current sensor communicably linked to the control circuit, the current sensor adapted to detect whether current is conducting through a power cord that provides power to the monitor, if current is conducting through the power cord, then the monitor is on, and if current is not conducting through the power cord, then the monitor is off.

22. The motorized mount system according to claim 17, where the first position is a retracted position and the second position is the extended position.

23. A method of repositioning an apparatus, the method comprising:
   rotating a first proximal end of a first pair of arms through a first motorized action to extend or retract a first distal end of the first pair of arms in a substantially horizontal manner, the first pair of arms having two pivot points between the first proximal end and the first distal end, where the two pivot points move away from each other as the first distal end retracts and vice versa, and the first distal end adapted to support the apparatus;

rotating the apparatus through a second motorized action near the first distal end to swivel the apparatus side to side;

rotating a second proximal end of a second pair of arms through a third motorized action to extend or retract a second distal end of the second pair of arms in a substantially horizontal manner, the second pair of arms having two pivot points between the second proximal end and the second distal end, where the two pivot points of the second pair of arms move away from each other as the second distal end retracts and vice versa, the first and second proximal ends aligned with respect to each other in a substantially vertical manner; and moving the second distal end relative to the first distal end to tilt the apparatus.

24. The method according to claim 23, including:
covering at least a portion of the first pair of arms to provide a space between the covering and the at least the portion of the first pair of arms;
sensing that the covering has been touched; and
stopping the rotating of the first proximal end when the sensing detects that the covering is touched.

25. The method according to claim 23, including:
placing the motorized mount system behind a door;
detecting whether the door is opened; and
activating the motorized mount system to extend if the door is opened.

26. The method according to claim 23, where the apparatus is a monitor with a power cord, the method including:
sensing current conducting through the power cord of the monitor to determine whether the monitor is turned on or off;
extending the monitor to a predetermined extended position if the sensing detects that the monitor is turned on; and
retracting the monitor to a predetermined retracted position if the sensing detects that the monitor is turned off.

27. A method of repositioning a monitor, the method comprising:
detecting electronically whether the monitor is on or off;
extending the monitor through motorized action from a retracted position to a predetermined extended position if the monitor is on; and
retracting the monitor through motorized action from the predetermined extended position to the retracted position if the monitor is off.

28. The method according to claim 27, the step of detecting includes interfacing with an output interface of the monitor to detect whether the monitor is on or off.

29. The method according to claim 27, the step of detecting includes sensing whether current is conducting through a power cord providing power to the monitor.

30. The method according to claim 27, the step of detecting includes sensing whether video data is outputted thorough an output interface of the monitor.

31. The method according to claim 27, the step of detecting includes sensing whether audio data is outputted thorough an output interface of the monitor.

32. A motorized mount system for adjusting viewing angle of a monitor, the system comprising:
a first arm having a first rear arm pivotably coupled to a first fore arm, the first rear arm having a first proximal end and the first fore arm having a first distal end;
a second arm having a second rear arm pivotably coupled to a second fore arm, the second rear arm having a second proximal end and the second fore arm having a second distal end, the first and second distal ends adapted to pivotably coupled to a back side of the monitor, and the first and second proximal ends adapted to pivot about their respective axes; and
a first motor coupled to the first proximal end to pivot the first proximal end about its pivot axis to either extend or retract the first and second distal ends relative to the first and second proximal ends, where the first proximal end is mechanically engaged with the second proximal end so that the first proximal end rotates in opposite direction of the second proximal end at the same rotational speed to cause the first and second distal ends to either extend or retract is a substantially perpendicular direction relative to the first and second rear arms.

33. A motorized mount system for adjusting viewing angle of a monitor, the system comprising:
a first arm having a first rear arm pivotably coupled to a first fore arm, the first rear arm having a first proximal end and the first fore arm having a first distal end;
a second arm having a second rear arm pivotably coupled to a second fore arm, the second rear arm having a second proximal end and the second fore arm having a second distal end, the first and second distal ends adapted to pivotably coupled to a back side of the monitor, and the first and second proximal ends adapted to pivot about their respective axes;
a first motor coupled to the first proximal end to pivot the first proximal end about its pivot axis to either extend or retract the first and second distal ends relative to the first and second proximal ends;
a third arm having a third rear arm pivotably coupled to a third fore arm, the third rear arm having a third proximal end and the third fore-arm having a third distal end;
a fourth arm having a fourth rear arm pivotably coupled to a fourth fore arm, the fourth rear arm having a fourth proximal end and the fourth fore-arm having a fourth distal end, the third and fourth distal ends pivotably coupled to the back side of the monitor, and the third and fourth proximal ends adapted to pivot about their respective axes; and
a second motor coupled to the third proximal end to pivot the third proximal end about its pivot axis to either extend or retract the third and fourth distal ends relative to the third and fourth proximal ends, where extending the third and fourth distal ends further than the first and second distal ends causes the monitor to tilt in an upward direction when in use, and extending the first and second distal ends further than the third and fourth distal ends causes the monitor to tilt in a downward direction when in use.

34. A motorized mount system for adjusting viewing angle of a monitor, the system comprising:
a first arm having a first rear arm pivotably coupled to a first fore arm, the first rear arm having a first proximal end and the first fore arm having a first distal end;
a second arm having a second rear arm pivotably coupled to a second fore arm, the second rear arm having a second proximal end and the second fore arm having a second distal end, the first and second distal ends adapted to pivotably coupled to a back side of the monitor, and the first and second proximal ends adapted to pivot about their respective axes;
a first motor coupled to the first proximal end to pivot the first proximal end about its pivot axis to either extend or retract the first and second distal ends relative to the first and second proximal ends; and a second motor coupled the first and second distal ends, the second motor mechanically engaged with a swiveling mechanism to swivel the monitor side to side.

35. A motorized mount system for adjusting viewing angle of a monitor, the system comprising:

a first arm having a first rear arm pivotably coupled to a first fore arm, the first rear arm having a first proximal end and the first fore arm having a first distal end;

a second arm having a second rear arm pivotably coupled to a second fore arm, the second rear arm having a second proximal end and the second fore arm having a second distal end, the first and second distal ends adapted to pivotably coupled to a back side of the monitor, and the first and second proximal ends adapted to pivot about their respective axes; and a first motor coupled to the first proximal end to pivot the first proximal end about its pivot axis to either extend or retract the first and second distal ends relative to the first and second proximal ends, where the motorized mount system is within an enclosure with a door, the motorized mount system includes a control circuit communicably coupled to a door sensor that detects whether the door is opened or closed, where the control circuit adapted to open the door first and then extend the monitor from the enclosure and retract the monitor within the enclosure before the door is closed.

36. A motorized mount system for adjusting viewing angle of a monitor, the system comprising:

a base plate adapted to mount to a support structure;

an adapter plate adapted to support a monitor;

a first arm having a first rear arm pivotably coupled to a first fore arm, the first ear arm having a first proximal end and the first fore arm having a first distal end;

a second arm having a second rear arm pivotably coupled to a second fore arm, the second rear arm having a second proximal end and the second fore arm having a second distal end;

the first and second distal ends pivotably coupled to the adapter plate;

the first and second proximal ends pivotably coupled to the base plate;

a first motor coupled to the first proximal end to pivot the first proximal end about its pivot axis to either extend or retract the first distal end relative to the base plate; and a second motor coupled the first and second distal ends, the second motor mechanically engaged with a swiveling mechanism to swivel the monitor when in use.

* * * * *